US011931802B2

(12) United States Patent
Cooper

(10) Patent No.: US 11,931,802 B2
(45) Date of Patent: Mar. 19, 2024

(54) MOLTEN METAL CONTROLLED FLOW LAUNDER

(71) Applicant: Molten Metal Equipment Innovations, LLC, Middlefield, OH (US)

(72) Inventor: Paul V. Cooper, Chesterland, OH (US)

(73) Assignee: Molten Metal Equipment Innovations, LLC, Middlefield, OH (US)

( * ) Notice: Subject to any disclaimer, the term of this patent is extended or adjusted under 35 U.S.C. 154(b) by 0 days.

(21) Appl. No.: 16/877,267

(22) Filed: May 18, 2020

(65) Prior Publication Data

US 2020/0360989 A1 Nov. 19, 2020

Related U.S. Application Data

(60) Provisional application No. 62/852,846, filed on May 24, 2019, provisional application No. 62/849,787, filed on May 17, 2019.

(51) Int. Cl.

| | |
|---|---|
| ***B22D 41/00*** | (2006.01) |
| ***B22D 35/04*** | (2006.01) |
| ***B22D 39/00*** | (2006.01) |
| ***B22D 39/02*** | (2006.01) |
| ***F04D 7/06*** | (2006.01) |
| ***F04D 29/02*** | (2006.01) |

(Continued)

(52) U.S. Cl.

CPC ............. *B22D 41/00* (2013.01); *B22D 35/04* (2013.01); *B22D 39/02* (2013.01); *F04D 7/065* (2013.01); *F04D 29/026* (2013.01); *F27B 3/045* (2013.01); *F27D 3/14* (2013.01); *F27D 27/005* (2013.01); *B22D 39/00* (2013.01); *F04D 29/426* (2013.01); *F27D 2003/0054* (2013.01); *F27M 2001/012* (2013.01)

(58) Field of Classification Search

CPC ........ B22D 41/00; B22D 35/04; B22D 39/00; F04D 7/065

See application file for complete search history.

(56) References Cited

U.S. PATENT DOCUMENTS

| | | | |
|---|---|---|---|
| 35,604 | A | 6/1862 | Guild |
| 116,797 | A | 7/1871 | Barnhart |

(Continued)

FOREIGN PATENT DOCUMENTS

| | | |
|---|---|---|
| CA | 683469 | 3/1964 |
| CA | 2115929 | 8/1992 |

(Continued)

OTHER PUBLICATIONS

"Response to Final Office Action and Request for Continued Examination for U.S. Appl. No. 09/275,627," including Declarations of Haynes and Johnson, dated Apr. 16, 2001.

(Continued)

*Primary Examiner* — Scott R Kastler

(74) *Attorney, Agent, or Firm* — SNELL & WILMER L.L.P.

(57) ABSTRACT

A launder for use in moving molten metal includes at least one relatively narrow channel through which molten metal flows. Using a narrow, rather than broad, channel permits better control of the flow and helps prevent overflowing the launder or a structure adjacent the launder. A molten metal pumping or transfer system may utilize a launder as disclosed herein.

11 Claims, 11 Drawing Sheets

(51) Int. Cl.

| | |
|---|---|
| ***F04D 29/42*** | (2006.01) |
| ***F27B 3/04*** | (2006.01) |
| ***F27D 3/00*** | (2006.01) |
| ***F27D 3/14*** | (2006.01) |
| ***F27D 27/00*** | (2010.01) |

(56) References Cited

U.S. PATENT DOCUMENTS

| | | | |
|---|---|---|---|
| 209,219 | A | 10/1878 | Bookwalter |
| 251,104 | A | 12/1881 | Finch |
| 307,845 | A | 11/1884 | Curtis |
| 364,804 | A | 6/1887 | Cole |
| 390,319 | A | 10/1888 | Thomson |
| 495,760 | A | 4/1893 | Seitz |
| 506,572 | A | 10/1893 | Wagener |
| 585,188 | A | 6/1897 | Davis |
| 757,932 | A | 4/1904 | Jones |
| 882,477 | A | 3/1908 | Neumann |
| 882,478 | A | 3/1908 | Neumann |
| 890,319 | A | 6/1908 | Wells |
| 898,499 | A | 9/1908 | O'Donnell |
| 909,774 | A | 1/1909 | Flora |
| 919,194 | A | 4/1909 | Livingston |
| 1,037,659 | A | 9/1912 | Rembert |
| 1,100,475 | A | 6/1914 | Franckaerts |
| 1,170,512 | A | 2/1916 | Chapman |
| 1,196,758 | A | 9/1916 | Blair |
| 1,304,068 | A | 5/1919 | Krogh |
| 1,331,997 | A | 2/1920 | Neal |
| 1,185,314 | A | 3/1920 | London |
| 1,377,101 | A | 5/1921 | Sparling |
| 1,380,798 | A | 6/1921 | Hansen et al. |
| 1,439,365 | A | 12/1922 | Hazell |
| 1,454,967 | A | 5/1923 | Gill |
| 1,470,607 | A | 10/1923 | Hazell |
| 1,513,875 | A | 11/1924 | Wilke |
| 1,518,501 | A | 12/1924 | Gill |
| 1,522,765 | A | 1/1925 | Wilke |
| 1,526,851 | A | 2/1925 | Hall |
| 1,669,668 | A | 5/1928 | Marshall |
| 1,673,594 | A | 6/1928 | Schmidt |
| 1,697,202 | A | 1/1929 | Nagle |
| 1,717,969 | A | 6/1929 | Goodner |
| 1,718,396 | A | 6/1929 | Wheeler |
| 1,896,201 | A | 2/1933 | Sterner-Rainer |
| 1,988,875 | A | 1/1935 | Saborio |
| 2,013,455 | A | 9/1935 | Baxter |
| 2,035,282 | A | 3/1936 | Schmeller, Sr. |
| 2,038,221 | A | 4/1936 | Kagi |
| 2,075,633 | A | 3/1937 | Anderegg |
| 2,090,162 | A | 8/1937 | Tighe |
| 2,091,677 | A | 8/1937 | Fredericks |
| 2,138,814 | A | 12/1938 | Bressler |
| 2,173,377 | A | 9/1939 | Schultz, Jr. et al. |
| 2,264,740 | A | 12/1941 | Brown |
| 2,280,979 | A | 4/1942 | Rocke |
| 2,290,961 | A | 7/1942 | Heuer |
| 2,300,688 | A | 11/1942 | Nagle |
| 2,304,849 | A | 12/1942 | Ruthman |
| 2,368,962 | A | 2/1945 | Blom |
| 2,383,424 | A | 8/1945 | Stepanoff |
| 2,423,655 | A | 7/1947 | Mars et al. |
| 2,488,447 | A | 11/1949 | Tangen et al. |
| 2,493,467 | A | 1/1950 | Sunnen |
| 2,515,097 | A | 7/1950 | Schryber |
| 2,515,478 | A | 7/1950 | Tooley et al. |
| 2,528,208 | A | 10/1950 | Bonsack et al. |
| 2,528,210 | A | 10/1950 | Stewart |
| 2,543,633 | A | 2/1951 | Lamphere |
| 2,566,892 | A | 4/1951 | Jacobs |
| 2,625,720 | A | 1/1953 | Ross |
| 2,626,086 | A | 1/1953 | Forrest |
| 2,676,279 | A | 4/1954 | Wilson |
| 2,677,609 | A | 4/1954 | Moore et al. |
| 2,698,583 | A | 1/1955 | House et al. |
| 2,714,354 | A | 8/1955 | Farrand |
| 2,762,095 | A | 9/1956 | Pemetzrieder |
| 2,768,587 | A | 10/1956 | Corneil |
| 2,775,348 | A | 12/1956 | Williams |
| 2,779,574 | A | 1/1957 | Schneider |
| 2,787,873 | A | 4/1957 | Hadley |
| 2,808,782 | A | 10/1957 | Thompson et al. |
| 2,809,107 | A | 10/1957 | Russell |
| 2,821,472 | A | 1/1958 | Peterson et al. |
| 2,824,520 | A | 2/1958 | Bartels |
| 2,832,292 | A | 4/1958 | Edwards |
| 2,839,006 | A | 6/1958 | Mayo |
| 2,853,019 | A | 9/1958 | Thornton |
| 2,865,295 | A | 12/1958 | Nikolaus |
| 2,865,618 | A | 12/1958 | Abell |
| 2,868,132 | A | 1/1959 | Rittershofer |
| 2,901,006 | A | 8/1959 | Andrews |
| 2,901,677 | A | 8/1959 | Chessman et al. |
| 2,906,632 | A | 9/1959 | Nickerson |
| 2,918,876 | A | 12/1959 | Howe |
| 2,948,524 | A | 8/1960 | Sweeney et al. |
| 2,958,293 | A | 11/1960 | Pray, Jr. |
| 2,966,345 | A | 12/1960 | Burgoon et al. |
| 2,966,381 | A | 12/1960 | Menzel |
| 2,978,885 | A | 4/1961 | Davison |
| 2,984,524 | A | 5/1961 | Franzen |
| 2,987,885 | A | 6/1961 | Hodge |
| 3,010,402 | A | 11/1961 | King |
| 3,015,190 | A | 1/1962 | Arbeit |
| 3,039,864 | A | 6/1962 | Hess |
| 3,044,408 | A | 7/1962 | Mellott |
| 3,048,384 | A | 8/1962 | Sweeney et al. |
| 3,070,393 | A | 12/1962 | Silverberg et al. |
| 3,092,030 | A | 6/1963 | Wunder |
| 3,099,870 | A | 8/1963 | Seeler |
| 3,128,327 | A | 4/1964 | Upton |
| 3,130,678 | A | 4/1964 | Chenault |
| 3,130,679 | A | 4/1964 | Sence |
| 3,151,565 | A | 10/1964 | Albertson et al. |
| 3,171,357 | A | 3/1965 | Egger |
| 3,172,850 | A | 3/1965 | Englesberg et al. |
| 3,203,182 | A | 8/1965 | Pohl |
| 3,227,547 | A | 1/1966 | Szekely |
| 3,244,109 | A | 4/1966 | Barske |
| 3,251,676 | A | 5/1966 | Johnson |
| 3,255,702 | A | 6/1966 | Gehrm |
| 3,258,283 | A | 6/1966 | Winberg et al. |
| 3,272,619 | A | 9/1966 | Sweeney et al. |
| 3,289,473 | A | 12/1966 | Louda |
| 3,291,473 | A | 12/1966 | Sweeney et al. |
| 3,368,805 | A | 2/1968 | Davey et al. |
| 3,374,943 | A | 3/1968 | Cervenka |
| 3,400,923 | A | 9/1968 | Howie et al. |
| 3,417,929 | A | 12/1968 | Secrest et al. |
| 3,432,336 | A | 3/1969 | Langrod et al. |
| 3,459,133 | A | 8/1969 | Scheffler |
| 3,459,346 | A | 8/1969 | Tinnes |
| 3,477,383 | A | 11/1969 | Rawson et al. |
| 3,487,805 | A | 1/1970 | Satterthwaite |
| 3,512,762 | A | 5/1970 | Umbricht |
| 3,512,788 | A | 5/1970 | Kilbane |
| 3,532,445 | A | 10/1970 | Scheffler et al. |
| 3,561,885 | A | 2/1971 | Lake |
| 3,575,525 | A | 4/1971 | Fox et al. |
| 3,581,767 | A | 6/1971 | Jackson |
| 3,612,715 | A | 10/1971 | Yedidiah |
| 3,618,917 | A | 11/1971 | Fredrikson et al. |
| 3,620,716 | A | 11/1971 | Hess |
| 3,650,730 | A | 3/1972 | Derham et al. |
| 3,689,048 | A | 9/1972 | Foulard et al. |
| 3,715,112 | A | 2/1973 | Carbonnel |
| 3,732,032 | A | 5/1973 | Daneel |
| 3,737,304 | A | 6/1973 | Blayden et al. |
| 3,737,305 | A | 6/1973 | Blayden et al. |
| 3,743,263 | A | 7/1973 | Szekely |
| 3,743,500 | A | 7/1973 | Foulard et al. |
| 3,753,690 | A | 8/1973 | Emley et al. |
| 3,759,628 | A | 9/1973 | Kempf |
| 3,759,635 | A | 9/1973 | Carter et al. |

(56) References Cited

U.S. PATENT DOCUMENTS 3,767,382 A 10/1973 Bruno et al.
3,776,660 A 12/1973 Anderson et al.
3,785,632 A 1/1974 Kraemer et al.
3,787,143 A 1/1974 Carbonnel et al.
3,799,522 A 3/1974 Brant et al.
3,799,523 A 3/1974 Seki
3,807,708 A 4/1974 Jones
3,814,400 A 6/1974 Seki
3,824,028 A 7/1974 Zenkner et al.
3,824,042 A 7/1974 Barnes et al.
3,836,280 A 9/1974 Koch
3,839,019 A 10/1974 Bruno et al.
3,844,972 A 10/1974 Tully, Jr. et al.
3,871,872 A 3/1975 Downing et al.
3,873,073 A 3/1975 Baum et al.
3,873,305 A 3/1975 Claxton et al.
3,881,039 A 4/1975 Baldieri et al.
3,886,992 A 6/1975 Maas et al.
3,915,594 A 10/1975 Nesseth
3,915,694 A 10/1975 Ando
3,935,003 A 1/1976 Steinke et al.
3,941,588 A 3/1976 Dremann
3,941,589 A 3/1976 Norman et al.
3,942,473 A * 3/1976 Chodash .............. B22D 11/005
118/610
3,954,134 A 5/1976 Maas et al.
3,958,979 A 5/1976 Valdo
3,958,981 A 5/1976 Forberg et al.
3,961,778 A 6/1976 Carbonnel et al.
3,966,456 A 6/1976 Ellenbaum et al.
3,967,286 A 6/1976 Andersson et al.
3,972,709 A 8/1976 Chin et al.
3,973,871 A 8/1976 Hance
3,984,234 A 10/1976 Claxton et al.
3,985,000 A 10/1976 Hartz
3,997,336 A 12/1976 van Linden et al.
4,003,560 A 1/1977 Carbonnel
4,008,884 A 2/1977 Fitzpatrick et al.
4,018,598 A 4/1977 Markus
4,043,146 A 8/1977 Stegherr et al.
4,052,199 A 10/1977 Mangalick
4,055,390 A 10/1977 Young
4,063,849 A 12/1977 Modianos
4,068,965 A 1/1978 Lichti
4,073,606 A 2/1978 Eller
4,091,970 A 5/1978 Komiyama et al.
4,119,141 A 10/1978 Thut et al.
4,125,146 A 11/1978 Muller
4,126,360 A 11/1978 Miller et al.
4,128,415 A 12/1978 van Linden et al.
4,147,474 A 4/1979 Heimdal et al.
4,169,584 A 10/1979 Mangalick
4,191,486 A 3/1980 Pelton
4,213,742 A 7/1980 Henshaw
4,242,039 A 12/1980 Villard et al.
4,244,423 A 1/1981 Thut et al.
4,286,985 A 9/1981 van Linden et al.
4,305,214 A 12/1981 Hurst
4,322,245 A 3/1982 Claxton
4,338,062 A 7/1982 Neal
4,347,041 A 8/1982 Cooper
4,351,514 A 9/1982 Koch
4,355,789 A 10/1982 Dolzhenkov et al.
4,356,940 A 11/1982 Ansorge
4,360,314 A 11/1982 Pennell
4,370,096 A 1/1983 Church
4,372,541 A 2/1983 Bocourt et al.
4,375,937 A 3/1983 Cooper
4,389,159 A 6/1983 Sarvanne
4,392,888 A 7/1983 Eckert et al.
4,410,299 A 10/1983 Shimoyama
4,419,049 A 12/1983 Gerboth et al.
4,456,424 A 6/1984 Araoka
4,470,846 A 9/1984 Dube
4,474,315 A 10/1984 Gilbert et al.
4,496,393 A 1/1985 Lustenberger
4,504,392 A 3/1985 Groteke
4,509,979 A 4/1985 Bauer
4,530,641 A 7/1985 Gschwender
4,537,624 A 8/1985 Tenhover et al.
4,537,625 A 8/1985 Tenhover et al.
4,545,887 A 10/1985 Amesen
4,556,419 A 12/1985 Otsuka et al.
4,557,766 A 12/1985 Tenhover et al.
4,586,845 A 5/1986 Morris
4,592,700 A 6/1986 Toguchi et al.
4,594,052 A 6/1986 Niskanen
4,596,510 A 6/1986 Arneth et al.
4,598,899 A 7/1986 Cooper
4,600,222 A 7/1986 Appling
4,607,825 A 8/1986 Briolle et al.
4,609,442 A 9/1986 Tenhover et al.
4,611,790 A 9/1986 Otsuka et al.
4,617,232 A 10/1986 Chandler et al.
4,634,105 A 1/1987 Withers et al.
4,640,666 A 2/1987 Sodergard
4,655,610 A 4/1987 Al-Jaroudi
4,668,166 A 5/1987 Lutz
4,669,953 A 6/1987 Gechwender
4,673,434 A 6/1987 Withers et al.
4,682,585 A 7/1987 Hiltebrandt
4,684,281 A 8/1987 Patterson
4,685,822 A 8/1987 Pelton
4,696,703 A 9/1987 Henderson et al.
4,701,226 A 10/1987 Henderson et al.
4,702,768 A 10/1987 Areauz et al.
4,714,371 A 12/1987 Cuse
4,717,540 A 1/1988 McRae et al.
4,739,974 A 4/1988 Mordue
4,741,664 A 5/1988 Olmstead
4,743,428 A 5/1988 McRae et al.
4,747,583 A 5/1988 Gordon et al.
4,767,230 A 8/1988 Leas, Jr.
4,770,701 A 9/1988 Henderson et al.
4,786,230 A 11/1988 Thut
4,802,656 A 2/1989 Hudault et al.
4,804,168 A 2/1989 Otsuka et al.
4,810,314 A 3/1989 Henderson et al.
4,822,473 A 4/1989 Arnesen
4,834,573 A 5/1989 Asano et al.
4,842,227 A 6/1989 Harrington et al.
4,844,425 A 7/1989 Piras et al.
4,851,296 A 7/1989 Tenhover et al.
4,854,834 A 8/1989 Gschwender et al.
4,859,413 A 8/1989 Harris et al.
4,860,819 A 8/1989 Moscoe et al.
4,867,638 A 9/1989 Handtmann et al.
4,884,786 A 12/1989 Gillespie
4,898,367 A 2/1990 Cooper
4,908,060 A 3/1990 Duenkelmann
4,909,704 A 3/1990 Lutz
4,911,726 A 3/1990 Warkentin
4,923,770 A 5/1990 Grasselli et al.
4,930,986 A 6/1990 Cooper
4,931,091 A 6/1990 Waite et al.
4,940,214 A 7/1990 Gillespie
4,940,384 A 7/1990 Amra et al.
4,954,167 A 9/1990 Cooper
4,967,827 A * 11/1990 Campbell .............. B22D 18/04
164/133
4,973,433 A 11/1990 Gilbert et al.
4,986,736 A 1/1991 Kajiwara et al.
4,989,736 A 2/1991 Andersson et al.
5,015,518 A 5/1991 Sasaki et al.
5,025,198 A 6/1991 Mordue et al.
5,028,211 A 7/1991 Mordue et al.
5,029,821 A 7/1991 Bar-on et al.
5,058,654 A 10/1991 Simmons
5,078,572 A 1/1992 Amra et al.
5,080,715 A 1/1992 Provencher et al.
5,083,753 A 1/1992 Soofi
5,088,893 A 2/1992 Gilbert et al.
5,092,821 A 3/1992 Gilbert et al.
5,098,134 A 3/1992 Monckton

(56) References Cited

U.S. PATENT DOCUMENTS 5,099,554 A 3/1992 Cooper
5,114,312 A 5/1992 Stanislao
5,126,047 A 6/1992 Martin et al.
5,131,632 A 7/1992 Olson
5,135,202 A 8/1992 Yamashita et al.
5,143,357 A 9/1992 Gilbert et al.
5,145,322 A 9/1992 Senior, Jr. et al.
5,152,631 A 10/1992 Bauer
5,154,652 A 10/1992 Ecklesdafer
5,158,440 A 10/1992 Cooper et al.
5,162,858 A 11/1992 Shoji et al.
5,165,858 A 11/1992 Gilbert et al.
5,177,304 A 1/1993 Nagel
5,191,154 A 3/1993 Nagel
5,192,193 A 3/1993 Cooper et al.
5,202,100 A 4/1993 Nagel et al.
5,203,681 A 4/1993 Cooper
5,209,641 A 5/1993 Hoglund et al.
5,215,448 A 6/1993 Cooper
5,268,020 A 12/1993 Claxton
5,286,163 A 2/1994 Amra et al.
5,298,233 A 3/1994 Nagel
5,301,620 A 4/1994 Nagel et al.
5,303,903 A 4/1994 Butler et al.
5,308,045 A 5/1994 Cooper
5,310,412 A 5/1994 Gilbert et al.
5,318,360 A 6/1994 Langer et al.
5,322,547 A 6/1994 Nagel et al.
5,324,341 A 6/1994 Nagel et al.
5,330,328 A 7/1994 Cooper
5,354,940 A 10/1994 Nagel
5,358,549 A 10/1994 Nagel et al.
5,358,697 A 10/1994 Nagel
5,364,078 A 11/1994 Pelton
5,369,063 A 11/1994 Gee et al.
5,383,651 A 1/1995 Blasen et al.
5,388,633 A 2/1995 Mercer, II et al.
5,395,405 A 3/1995 Nagel et al.
5,399,074 A 3/1995 Nose et al.
5,407,294 A 4/1995 Giannini
5,411,240 A 5/1995 Rapp et al.
5,425,410 A 6/1995 Reynolds
5,431,551 A 7/1995 Aquino et al.
5,435,982 A 7/1995 Wilkinson
5,436,210 A 7/1995 Wilkinson et al.
5,443,572 A 8/1995 Wilkinson et al.
5,454,423 A 10/1995 Tsuchida et al.
5,468,280 A 11/1995 Areaux
5,470,201 A 11/1995 Gilbert et al.
5,484,265 A 1/1996 Horvath et al.
5,489,734 A 2/1996 Nagel et al.
5,491,279 A 2/1996 Robert et al.
5,494,382 A 2/1996 Kloppers
5,495,746 A 3/1996 Sigworth
5,505,143 A 4/1996 Nagel
5,505,435 A 4/1996 Laszlo
5,509,791 A 4/1996 Turner
5,511,766 A 4/1996 Vassilicos
5,520,422 A 5/1996 Friedrich
5,537,940 A 7/1996 Nagel et al.
5,543,558 A 8/1996 Nagel et al.
5,555,822 A 9/1996 Loewen et al.
5,558,501 A 9/1996 Wang et al.
5,558,505 A 9/1996 Mordue et al.
5,571,486 A 11/1996 Robert et al.
5,585,532 A 12/1996 Nagel
5,586,863 A 12/1996 Gilbert et al.
5,591,243 A 1/1997 Colussi et al.
5,597,289 A 1/1997 Thut
5,613,245 A 3/1997 Robert
5,616,167 A 4/1997 Eckert
5,622,481 A 4/1997 Thut
5,629,464 A 5/1997 Bach et al.
5,634,770 A 6/1997 Gilbert et al.
5,640,706 A 6/1997 Nagel et al.
5,640,707 A 6/1997 Nagel et al.
5,640,709 A 6/1997 Nagel et al.
5,655,849 A 8/1997 McEwen et al.
5,660,614 A 8/1997 Waite et al.
5,662,725 A 9/1997 Cooper
5,676,520 A 10/1997 Thut
5,678,244 A 10/1997 Shaw et al.
5,678,807 A 10/1997 Cooper
5,679,132 A 10/1997 Rauenzahn et al.
5,685,701 A 11/1997 Chandler et al.
5,690,888 A 11/1997 Robert
5,695,732 A 12/1997 Sparks et al.
5,716,195 A 2/1998 Thut
5,717,149 A 2/1998 Nagel et al.
5,718,416 A 2/1998 Flisakowski et al.
5,735,668 A 4/1998 Klein
5,735,935 A 4/1998 Areaux
5,741,422 A 4/1998 Eichenmiller et al.
5,744,093 A * 4/1998 Davis ........................ C21B 7/14
266/45
5,744,117 A 4/1998 Wilkinson et al.
5,745,861 A 4/1998 Bell et al.
5,755,847 A 5/1998 Quayle
5,758,712 A 6/1998 Pederson
5,772,324 A 6/1998 Falk
5,776,420 A 7/1998 Nagel
5,785,494 A 7/1998 Vild et al.
5,842,832 A 12/1998 Thut
5,846,481 A 12/1998 Tilak
5,858,059 A 1/1999 Abramovich et al.
5,863,314 A 1/1999 Morando
5,866,095 A 2/1999 McGeever et al.
5,875,385 A 2/1999 Stephenson et al.
5,935,528 A 8/1999 Stephenson et al.
5,944,496 A 8/1999 Cooper
5,947,705 A 9/1999 Mordue et al.
5,948,352 A 9/1999 Jagt et al.
5,951,243 A 9/1999 Cooper
5,961,285 A 10/1999 Meneice et al.
5,963,580 A 10/1999 Eckert
5,992,230 A 11/1999 Scarpa et al.
5,993,726 A 11/1999 Huang
5,993,728 A 11/1999 Vild
6,007,313 A 12/1999 Siegel
6,019,576 A 2/2000 Thut
6,027,685 A 2/2000 Cooper
6,036,745 A 3/2000 Gilbert et al.
6,074,455 A 6/2000 van Linden et al.
6,082,965 A 7/2000 Morando
6,093,000 A 7/2000 Cooper
6,096,109 A 8/2000 Nagel et al.
6,113,154 A 9/2000 Thut
6,123,523 A 9/2000 Cooper
6,152,691 A 11/2000 Thut
6,168,753 B1 1/2001 Morando
6,187,096 B1 2/2001 Thut
6,199,836 B1 3/2001 Rexford et al.
6,217,823 B1 4/2001 Vild et al.
6,231,639 B1 5/2001 Eichenmiller
6,250,881 B1 6/2001 Mordue et al.
6,254,340 B1 7/2001 Vild et al.
6,270,717 B1 8/2001 Tremblay et al.
6,280,157 B1 8/2001 Cooper
6,293,759 B1 9/2001 Thut
6,303,074 B1 10/2001 Cooper
6,345,964 B1 2/2002 Cooper
6,354,796 B1 3/2002 Morando
6,358,467 B1 3/2002 Mordue
6,364,930 B1 4/2002 Kos
6,371,723 B1 4/2002 Grant et al.
6,398,525 B1 6/2002 Cooper
6,439,860 B1 8/2002 Greer
6,451,247 B1 9/2002 Mordue et al.
6,457,940 B1 10/2002 Lehman
6,457,950 B1 10/2002 Cooper et al.
6,464,458 B2 10/2002 Vild et al.
6,474,962 B1 11/2002 Allen et al.
6,495,948 B1 12/2002 Garrett, III
6,497,559 B1 12/2002 Grant

(56) References Cited

U.S. PATENT DOCUMENTS

| | | | |
|---|---|---|---|
| 6,500,228 | B1 | 12/2002 | Klingensmith et al. |
| 6,503,292 | B2 | 1/2003 | Klingensmith et al. |
| 6,524,066 | B2 | 2/2003 | Thut |
| 6,533,535 | B2 | 3/2003 | Thut |
| 6,551,060 | B2 | 4/2003 | Mordue et al. |
| 6,562,286 | B1 | 5/2003 | Lehman |
| 6,656,415 | B2 | 12/2003 | Kos |
| 6,679,936 | B2 | 1/2004 | Quackenbush |
| 6,689,310 | B1 | 2/2004 | Cooper |
| 6,709,234 | B2 | 3/2004 | Gilbert et al. |
| 6,716,147 | B1 | 4/2004 | Hinkle et al. |
| 6,723,276 | B1 | 4/2004 | Cooper |
| 6,805,834 | B2 | 10/2004 | Thut |
| 6,843,640 | B2 | 1/2005 | Mordue et al. |
| 6,848,497 | B2 | 2/2005 | Sale et al. |
| 6,869,271 | B2 | 3/2005 | Gilbert et al. |
| 6,869,564 | B2 | 3/2005 | Gilbert et al. |
| 6,881,030 | B2 | 4/2005 | Thut |
| 6,887,424 | B2 | 5/2005 | Ohno et al. |
| 6,887,425 | B2 | 5/2005 | Mordue et al. |
| 6,902,696 | B2 | 6/2005 | Klingensmith et al. |
| 7,037,462 | B2 | 5/2006 | Klingensmith et al. |
| 7,074,361 | B2 | 7/2006 | Carolla et al. |
| 7,083,758 | B2 | 8/2006 | Tremblay |
| 7,131,482 | B2 | 11/2006 | Vincent et al. |
| 7,157,043 | B2 | 1/2007 | Neff |
| 7,204,954 | B2 | 4/2007 | Mizuno |
| 7,273,582 | B2 | 9/2007 | Mordue |
| 7,279,128 | B2 | 10/2007 | Kennedy et al. |
| 7,326,028 | B2 | 2/2008 | Morando |
| 7,402,276 | B2 | 7/2008 | Cooper |
| 7,470,392 | B2 | 12/2008 | Cooper |
| 7,476,357 | B2 | 1/2009 | Thut |
| 7,481,966 | B2 | 1/2009 | Mizuno |
| 7,497,988 | B2 | 3/2009 | Thut |
| 7,507,365 | B2 | 3/2009 | Thut |
| 7,507,367 | B2 | 3/2009 | Cooper |
| 7,543,605 | B1 | 6/2009 | Morando |
| 7,731,891 | B2 | 6/2010 | Cooper |
| 7,771,171 | B2 | 8/2010 | Mohr |
| 7,841,379 | B1 | 11/2010 | Evans |
| 7,896,617 | B1 | 3/2011 | Morando |
| 7,906,068 | B2 | 3/2011 | Cooper |
| 8,075,837 | B2 | 12/2011 | Cooper |
| 8,110,141 | B2 | 2/2012 | Cooper |
| 8,137,023 | B2 | 3/2012 | Greer |
| 8,142,145 | B2 | 3/2012 | Thut |
| 8,178,037 | B2 | 5/2012 | Cooper |
| 8,328,540 | B2 | 12/2012 | Wang |
| 8,333,921 | B2 | 12/2012 | Thut |
| 8,337,746 | B2 | 12/2012 | Cooper |
| 8,361,379 | B2 | 1/2013 | Cooper |
| 8,366,993 | B2 | 2/2013 | Cooper |
| 8,409,495 | B2 | 4/2013 | Cooper |
| 8,440,135 | B2 | 5/2013 | Cooper |
| 8,444,911 | B2 | 5/2013 | Cooper |
| 8,449,814 | B2 | 5/2013 | Cooper |
| 8,475,594 | B2 | 7/2013 | Bright et al. |
| 8,475,708 | B2 | 7/2013 | Cooper |
| 8,480,950 | B2 | 7/2013 | Jetten et al. |
| 8,501,084 | B2 | 8/2013 | Cooper |
| 8,524,146 | B2 | 9/2013 | Cooper |
| 8,529,828 | B2 | 9/2013 | Cooper |
| 8,535,603 | B2 | 9/2013 | Cooper |
| 8,580,218 | B2 | 11/2013 | Turenne et al. |
| 8,613,884 | B2 | 12/2013 | Cooper |
| 8,714,914 | B2 | 5/2014 | Cooper |
| 8,753,563 | B2 | 6/2014 | Cooper |
| 8,840,359 | B2 | 9/2014 | Vick et al. |
| 8,899,932 | B2 | 12/2014 | Tetkoskie et al. |
| 8,915,830 | B2 | 12/2014 | March et al. |
| 8,920,680 | B2 | 12/2014 | Mao |
| 9,011,761 | B2 | 4/2015 | Cooper |
| 9,017,597 | B2 | 4/2015 | Cooper |
| 9,034,244 | B2 | 5/2015 | Cooper |
| 9,057,376 | B2 | 6/2015 | Thut |
| 9,057,377 | B1 | 6/2015 | Thut |
| 9,074,601 | B1 | 7/2015 | Thut |
| 9,080,577 | B2 | 7/2015 | Cooper |
| 9,108,224 | B2 | 8/2015 | Schererz et al. |
| 9,108,244 | B2 | 8/2015 | Cooper |
| 9,156,087 | B2 | 10/2015 | Cooper |
| 9,193,532 | B2 | 11/2015 | March et al. |
| 9,205,490 | B2 | 12/2015 | Cooper |
| 9,234,520 | B2 | 1/2016 | Morando |
| 9,273,376 | B2 | 3/2016 | Lutes et al. |
| 9,328,615 | B2 | 5/2016 | Cooper |
| 9,377,028 | B2 | 6/2016 | Cooper |
| 9,382,599 | B2 | 7/2016 | Cooper |
| 9,383,140 | B2 | 7/2016 | Cooper |
| 9,388,925 | B2 | 7/2016 | Juarez |
| 9,409,232 | B2 | 8/2016 | Cooper |
| 9,410,744 | B2 | 8/2016 | Cooper |
| 9,422,942 | B2 | 8/2016 | Cooper |
| 9,435,343 | B2 | 9/2016 | Cooper |
| 9,464,636 | B2 | 10/2016 | Cooper |
| 9,470,239 | B2 | 10/2016 | Cooper |
| 9,476,644 | B2 | 10/2016 | Howitt et al. |
| 9,481,035 | B2 | 11/2016 | Cooper |
| 9,481,918 | B2 | 11/2016 | Vild et al. |
| 9,482,469 | B2 | 11/2016 | Cooper |
| 9,494,366 | B1 | 11/2016 | Thut |
| 9,506,129 | B2 | 11/2016 | Cooper |
| 9,506,346 | B2 | 11/2016 | Bright et al. |
| 9,532,670 | B2 | 1/2017 | Vaessan |
| 9,566,645 | B2 | 2/2017 | Cooper |
| 9,581,388 | B2 | 2/2017 | Cooper |
| 9,587,883 | B2 | 3/2017 | Cooper |
| 9,632,670 | B2 | 4/2017 | Wu |
| 9,643,247 | B2 | 5/2017 | Cooper |
| 9,657,578 | B2 | 5/2017 | Cooper |
| 9,855,600 | B2 | 1/2018 | Cooper |
| 9,862,026 | B2 | 1/2018 | Cooper |
| 9,903,383 | B2 | 2/2018 | Cooper |
| 9,909,808 | B2 | 3/2018 | Cooper |
| 9,920,767 | B2 | 3/2018 | Klain et al. |
| 9,925,587 | B2 | 3/2018 | Cooper |
| 9,951,777 | B2 | 4/2018 | Morando et al. |
| 9,970,442 | B2 | 5/2018 | Tipton |
| 9,982,945 | B2 | 5/2018 | Cooper |
| 10,052,688 | B2 | 8/2018 | Cooper |
| 10,072,897 | B2 | 9/2018 | Cooper |
| 10,126,058 | B2 | 11/2018 | Cooper |
| 10,126,059 | B2 | 11/2018 | Cooper |
| 10,138,892 | B2 | 11/2018 | Cooper |
| 10,195,664 | B2 | 2/2019 | Cooper et al. |
| 10,267,314 | B2 | 4/2019 | Cooper |
| 10,274,256 | B2 | 4/2019 | Cooper |
| 10,302,361 | B2 | 5/2019 | Cooper |
| 10,307,821 | B2 | 6/2019 | Cooper |
| 10,309,725 | B2 | 6/2019 | Cooper |
| 10,322,451 | B2 | 6/2019 | Cooper |
| 10,345,045 | B2 | 7/2019 | Cooper |
| 10,352,620 | B2 | 7/2019 | Cooper |
| 10,428,821 | B2 | 10/2019 | Cooper |
| 10,458,708 | B2 | 10/2019 | Cooper |
| 10,465,688 | B2 | 11/2019 | Cooper |
| 10,562,097 | B2 | 2/2020 | Cooper |
| 10,570,745 | B2 | 2/2020 | Cooper |
| 10,641,270 | B2 | 5/2020 | Cooper |
| 10,641,279 | B2 | 5/2020 | Cooper |
| 10,675,679 | B2 | 6/2020 | Cooper |
| 11,020,798 | B2 | 6/2021 | Cooper |
| 11,103,920 | B2 | 8/2021 | Cooper |
| 11,098,719 | B2 | 9/2021 | Cooper |
| 11,098,720 | B2 | 9/2021 | Cooper |
| 11,130,173 | B2 | 9/2021 | Cooper |
| 11,149,747 | B2 | 10/2021 | Cooper |
| 11,167,345 | B2 | 11/2021 | Cooper |
| 11,185,916 | B2 | 11/2021 | Cooper |
| 11,286,939 | B2 | 3/2022 | Cooper |
| 11,358,216 | B2 | 6/2022 | Cooper |
| 11,358,217 | B2 | 6/2022 | Cooper |
| 11,391,293 | B2 | 7/2022 | Cooper |

(56) References Cited

U.S. PATENT DOCUMENTS

| | | | |
|---|---|---|---|
| 11,471,938 | B2 | 10/2022 | Fontana |
| 11,519,414 | B2 | 12/2022 | Cooper |
| 2001/0000465 | A1 | 4/2001 | Thut |
| 2002/0089099 | A1 | 7/2002 | Denning |
| 2002/0102159 | A1 | 8/2002 | Thut |
| 2002/0146313 | A1 | 10/2002 | Thut |
| 2002/0185790 | A1 | 12/2002 | Kilgensmith |
| 2002/0185794 | A1 | 12/2002 | Vincent |
| 2003/0047850 | A1 | 3/2003 | Areaux |
| 2003/0075844 | A1 | 4/2003 | Mordue et al. |
| 2003/0082052 | A1 | 5/2003 | Gilbert et al. |
| 2003/0151176 | A1 | 8/2003 | Ohno |
| 2003/0201583 | A1 | 10/2003 | Klingensmith |
| 2004/0050525 | A1 | 3/2004 | Kennedy et al. |
| 2004/0076533 | A1 | 4/2004 | Cooper |
| 2004/0096330 | A1 | 5/2004 | Gilbert |
| 2004/0115079 | A1 | 6/2004 | Cooper |
| 2004/0245684 | A1* | 12/2004 | Kojo ......................... C21B 7/14 266/227 |
| 2004/0262825 | A1 | 12/2004 | Cooper |
| 2005/0013713 | A1 | 1/2005 | Cooper |
| 2005/0013714 | A1 | 1/2005 | Cooper |
| 2005/0013715 | A1 | 1/2005 | Cooper |
| 2005/0053499 | A1 | 3/2005 | Cooper |
| 2005/0077730 | A1 | 4/2005 | Thut |
| 2005/0081607 | A1 | 4/2005 | Patel et al. |
| 2005/0116398 | A1 | 6/2005 | Tremblay |
| 2006/0180963 | A1 | 8/2006 | Thut |
| 2006/0198725 | A1 | 9/2006 | Thut |
| 2007/0253807 | A1 | 11/2007 | Cooper |
| 2008/0163999 | A1* | 7/2008 | Hymas .................... C04B 35/66 164/1 |
| 2008/0202644 | A1 | 8/2008 | Grassi |
| 2008/0211147 | A1 | 9/2008 | Cooper |
| 2008/0213111 | A1 | 9/2008 | Cooper |
| 2008/0230966 | A1 | 9/2008 | Cooper |
| 2008/0253905 | A1 | 10/2008 | Morando et al. |
| 2008/0304970 | A1 | 12/2008 | Cooper |
| 2008/0314548 | A1 | 12/2008 | Cooper |
| 2009/0054167 | A1 | 2/2009 | Cooper |
| 2009/0140013 | A1 | 6/2009 | Cooper |
| 2009/0269191 | A1 | 10/2009 | Cooper |
| 2010/0104415 | A1 | 4/2010 | Morando |
| 2010/0200354 | A1 | 8/2010 | Yagi et al. |
| 2011/0133374 | A1 | 6/2011 | Cooper |
| 2011/0140318 | A1* | 6/2011 | Reeves ..................... C21B 7/14 266/215 |
| 2011/0140319 | A1 | 6/2011 | Cooper |
| 2011/0140619 | A1 | 6/2011 | Lin |
| 2011/0142603 | A1 | 6/2011 | Cooper |
| 2011/0142606 | A1 | 6/2011 | Cooper |
| 2011/0148012 | A1 | 6/2011 | Cooper |
| 2011/0163486 | A1 | 7/2011 | Cooper |
| 2011/0210232 | A1 | 9/2011 | Cooper |
| 2011/0220771 | A1 | 9/2011 | Cooper |
| 2011/0227338 | A1 | 9/2011 | Pollack |
| 2011/0303706 | A1 | 12/2011 | Cooper |
| 2012/0003099 | A1 | 1/2012 | Tetkoskie |
| 2012/0163959 | A1 | 6/2012 | Morando |
| 2013/0105102 | A1 | 5/2013 | Cooper |
| 2013/0142625 | A1 | 6/2013 | Cooper |
| 2013/0214014 | A1 | 8/2013 | Cooper |
| 2013/0224038 | A1 | 8/2013 | Tetkoskie et al. |
| 2013/0292426 | A1 | 11/2013 | Cooper |
| 2013/0292427 | A1 | 11/2013 | Cooper |
| 2013/0299524 | A1 | 11/2013 | Cooper |
| 2013/0299525 | A1 | 11/2013 | Cooper |
| 2013/0306687 | A1 | 11/2013 | Cooper |
| 2013/0334744 | A1 | 12/2013 | Tremblay |
| 2013/0343904 | A1 | 12/2013 | Cooper |
| 2014/0008849 | A1 | 1/2014 | Cooper |
| 2014/0041252 | A1 | 2/2014 | Vild et al. |
| 2014/0044520 | A1 | 2/2014 | Tipton |
| 2014/0083253 | A1 | 3/2014 | Lutes et al. |
| 2014/0210144 | A1 | 7/2014 | Torres et al. |
| 2014/0232048 | A1 | 8/2014 | Howitt et al. |
| 2014/0252697 | A1 | 9/2014 | Rauch |
| 2014/0252701 | A1 | 9/2014 | Cooper |
| 2014/0261800 | A1 | 9/2014 | Cooper |
| 2014/0263482 | A1 | 9/2014 | Cooper |
| 2014/0265068 | A1 | 9/2014 | Cooper |
| 2014/0271219 | A1 | 9/2014 | Cooper |
| 2014/0363309 | A1 | 12/2014 | Henderson et al. |
| 2015/0069679 | A1 | 3/2015 | Henderson et al. |
| 2015/0184311 | A1 | 7/2015 | Turenne |
| 2015/0192364 | A1 | 7/2015 | Cooper |
| 2015/0217369 | A1 | 8/2015 | Cooper |
| 2015/0219111 | A1 | 8/2015 | Cooper |
| 2015/0219112 | A1 | 8/2015 | Cooper |
| 2015/0219113 | A1 | 8/2015 | Cooper |
| 2015/0219114 | A1 | 8/2015 | Cooper |
| 2015/0224574 | A1 | 8/2015 | Cooper |
| 2015/0252807 | A1 | 9/2015 | Cooper |
| 2015/0285557 | A1 | 10/2015 | Cooper |
| 2015/0285558 | A1 | 10/2015 | Cooper |
| 2015/0323256 | A1 | 11/2015 | Cooper |
| 2015/0328682 | A1 | 11/2015 | Cooper |
| 2015/0328683 | A1 | 11/2015 | Cooper |
| 2016/0031007 | A1 | 2/2016 | Cooper |
| 2016/0040265 | A1 | 2/2016 | Cooper |
| 2016/0047602 | A1 | 2/2016 | Cooper |
| 2016/0053762 | A1 | 2/2016 | Cooper |
| 2016/0053814 | A1 | 2/2016 | Cooper |
| 2016/0082507 | A1 | 3/2016 | Cooper |
| 2016/0089718 | A1 | 3/2016 | Cooper |
| 2016/0091251 | A1 | 3/2016 | Cooper |
| 2016/0116216 | A1 | 4/2016 | Schlicht et al. |
| 2016/0221855 | A1 | 8/2016 | Retorick et al. |
| 2016/0250686 | A1 | 9/2016 | Cooper |
| 2016/0265535 | A1 | 9/2016 | Cooper |
| 2016/0305711 | A1 | 10/2016 | Cooper |
| 2016/0320129 | A1 | 11/2016 | Cooper |
| 2016/0320130 | A1 | 11/2016 | Cooper |
| 2016/0320131 | A1 | 11/2016 | Cooper |
| 2016/0346836 | A1 | 12/2016 | Henderson et al. |
| 2016/0348973 | A1 | 12/2016 | Cooper |
| 2016/0348974 | A1 | 12/2016 | Cooper |
| 2016/0348975 | A1 | 12/2016 | Cooper |
| 2017/0037852 | A1 | 2/2017 | Bright et al. |
| 2017/0038146 | A1 | 2/2017 | Cooper |
| 2017/0045298 | A1 | 2/2017 | Cooper |
| 2017/0056973 | A1 | 3/2017 | Tremblay et al. |
| 2017/0082368 | A1 | 3/2017 | Cooper |
| 2017/0106435 | A1 | 4/2017 | Vincent |
| 2017/0106441 | A1* | 4/2017 | Vincent .................. B22D 35/04 |
| 2017/0130298 | A1 | 5/2017 | Teranishi et al. |
| 2017/0167793 | A1 | 6/2017 | Cooper et al. |
| 2017/0198721 | A1 | 7/2017 | Cooper |
| 2017/0219289 | A1 | 8/2017 | Williams et al. |
| 2017/0241713 | A1 | 8/2017 | Henderson et al. |
| 2017/0246681 | A1 | 8/2017 | Tipton et al. |
| 2017/0276430 | A1 | 9/2017 | Cooper |
| 2018/0058465 | A1 | 3/2018 | Cooper |
| 2018/0111189 | A1 | 4/2018 | Cooper |
| 2018/0178281 | A1 | 6/2018 | Cooper |
| 2018/0195513 | A1 | 7/2018 | Cooper |
| 2018/0311726 | A1 | 11/2018 | Cooper |
| 2019/0032675 | A1 | 1/2019 | Cooper |
| 2019/0270134 | A1 | 9/2019 | Cooper |
| 2019/0293089 | A1 | 9/2019 | Cooper |
| 2019/0351481 | A1 | 11/2019 | Tetkoskie |
| 2019/0360491 | A1 | 11/2019 | Cooper |
| 2019/0360492 | A1 | 11/2019 | Cooper |
| 2019/0368494 | A1 | 12/2019 | Cooper |
| 2020/0130050 | A1 | 4/2020 | Cooper |
| 2020/0130051 | A1 | 4/2020 | Cooper |
| 2020/0130052 | A1 | 4/2020 | Cooper |
| 2020/0130053 | A1 | 4/2020 | Cooper |
| 2020/0130054 | A1 | 4/2020 | Cooper |
| 2020/0182247 | A1 | 6/2020 | Cooper |
| 2020/0182248 | A1 | 6/2020 | Cooper |
| 2020/0256350 | A1 | 8/2020 | Cooper |
| 2020/0360987 | A1 | 11/2020 | Cooper |
| 2020/0360988 | A1 | 11/2020 | Fontana |

(56) References Cited

U.S. PATENT DOCUMENTS

| | | | | |
|---|---|---|---|---|
| 2020/0360989 | A1 * | 11/2020 | Cooper | F04D 29/026 |
| 2020/0360990 | A1 | 11/2020 | Cooper | |
| 2020/0362865 | A1 | 11/2020 | Cooper | |
| 2020/0363128 | A1 | 11/2020 | Cooper | |
| 2021/0199115 | A1 | 7/2021 | Cooper | |
| 2021/0254622 | A1 | 8/2021 | Cooper | |
| 2022/0025905 | A1 | 1/2022 | Cooper | |
| 2022/0080498 | A1 | 3/2022 | Cooper | |
| 2022/0193764 | A1 | 6/2022 | Cooper | |
| 2022/0213895 | A1 | 7/2022 | Cooper | |
| 2022/0234099 | A1 | 7/2022 | Cooper | |
| 2022/0381246 | A1 | 12/2022 | Cooper | |
| 2023/0001474 | A1 | 1/2023 | Cooper | |
| 2023/0219132 | A1 | 7/2023 | Cooper | |

FOREIGN PATENT DOCUMENTS

| | | | | |
|---|---|---|---|---|
| CA | 2244251 | | 6/1998 | |
| CA | 2305865 | | 2/2000 | |
| CA | 2176475 | | 7/2005 | |
| CA | 2924572 | | 4/2015 | |
| CH | 392268 | | 9/1965 | |
| CN | 102943761 | | 2/2013 | |
| CN | 103511331 | A | 1/2014 | |
| DE | 1800446 | | 12/1969 | |
| DE | 19541093 | | 5/1997 | |
| DE | 19614350 | | 10/1997 | |
| DE | 102006051814 | B3 * | 7/2008 | B22D 35/04 |
| EP | 168250 | | 1/1986 | |
| EP | 665378 | | 8/1995 | |
| EP | 1019635 | | 6/2006 | |
| GB | 543607 | | 3/1942 | |
| GB | 942648 | | 11/1963 | |
| GB | 1185314 | | 3/1970 | |
| GB | 1565911 | A * | 4/1980 | B22D 41/02 |
| GB | 1575991 | | 10/1980 | |
| GB | 212260 | | 1/1984 | |
| GB | 2193257 | | 2/1988 | |
| GB | 2217784 | | 3/1989 | |
| GB | 2289919 | | 12/1995 | |
| JP | 58048796 | | 3/1983 | |
| JP | 63104773 | | 5/1988 | |
| JP | 11-270799 | | 10/1999 | |
| JP | 5112837 | | 1/2013 | |
| MX | 227385 | | 4/2005 | |
| NO | 90756 | | 1/1959 | |
| SU | 416401 | | 2/1974 | |
| SU | 773312 | | 10/1980 | |
| WO | 199808990 | | 3/1998 | |
| WO | 199825031 | | 6/1998 | |
| WO | 200009889 | | 2/2000 | |
| WO | 2002012147 | | 2/2002 | |
| WO | 2004029307 | | 4/2004 | |
| WO | 2010147932 | | 12/2010 | |
| WO | 2014031484 | A2 | 2/2014 | |
| WO | 2014055082 | | 4/2014 | |
| WO | 2014150503 | | 9/2014 | |
| WO | 2014185971 | | 11/2014 | |

OTHER PUBLICATIONS

Document No. 504217: Excerpts from "Pyrotek Inc.'s Motion for Summary Judgment of Invalidity and Unenforceability of U.S. Pat. No. 7,402,276," Oct. 2, 2009.

Document No. 505026: Excerpts from "MMEI's Response to Pyrotek's Motion for Summary Judgment of Invalidity or Enforceability of U.S. Pat. No. 7,402,276," Oct. 9, 2009.

Document No. 507689: Excerpts from "MMEI's Pre-Hearing Brief and Supplemental Motion for Summary Judgment of Infringement of Claims 3, 4, 15, 17-20, 26, 28 and 29 of the '074 Patent and Motion for Reconsideration of the Validity of Claims 7-9 of the '276 Patent," Nov. 4, 2009.

Document No. 517158: Excerpts from "Reasoned Award," Feb. 19, 2010.

Document No. 525055: Excerpts from "Molten Metal Equipment Innovations, Inc.'s Reply Brief in Support of Application to Confirm Arbitration Award and Opposition to Motion to Vacate," May 12, 2010.

USPTO; Notice of Reissue Examination Certificate dated Aug. 27, 2001 in U.S. Appl. No. 90/005,910.

* cited by examiner

MOLTEN METAL CONTROLLED FLOW LAUNDER

CROSS REFERENCE TO RELATED APPLICATIONS

This application claims priority to and incorporates by reference: (1) U.S. Provisional Patent Application Ser. No. 62/849,787 filed May 17, 2019 and entitled MOLTEN METAL PUMPS, COMPONENTS, SYSTEMS AND METHODS, and (2) U.S. Provisional Patent Application Ser. No. 62/852,846 filed May 24, 2019 and entitled SMART MOLTEN METAL PUMP.

BACKGROUND OF THE INVENTION

As used herein, the term "molten metal" means any metal or combination of metals in liquid form, such as aluminum, copper, iron, zinc and alloys thereof. The term "gas" means any gas or combination of gases, including argon, nitrogen, chlorine, fluorine, Freon, and helium, which are released into molten metal.

Known molten-metal pumps include a pump base (also called a housing or casing), one or more inlets (an inlet being an opening in the housing to allow molten metal to enter a pump chamber), a pump chamber of any suitable configuration, which is an open area formed within the housing, and a discharge, which is a channel or conduit of any structure or type communicating with the pump chamber (in an axial pump the chamber and discharge may be the same structure or different areas of the same structure) leading from the pump chamber to an outlet, which is an opening formed in the exterior of the housing through which molten metal exits the casing. An impeller, also called a rotor, is mounted in the pump chamber and is connected to a drive system. The drive shaft is typically an impeller shaft connected to one end of a motor shaft, the other end of the drive shaft being connected to an impeller. Often, the impeller (or rotor) shaft is comprised of graphite and/or ceramic, the motor shaft is comprised of steel, and the two are connected by a coupling. As the motor turns the drive shaft, the drive shaft turns the impeller and the impeller pushes molten metal out of the pump chamber, through the discharge, out of the outlet and into the molten metal bath. Most molten metal pumps are gravity fed, wherein gravity forces molten metal through the inlet and into the pump chamber as the impeller pushes molten metal out of the pump chamber. Other molten metal pumps do not include a base or support posts and are sized to fit into a structure by which molten metal is pumped. Most pumps have a metal platform, or super structure, that is either supported by a plurality of support posts attached to the pump base, or unsupported if there is no base. The motor is positioned on the superstructure, if a superstructure is used.

This application incorporates by reference the portions of the following publications that are not inconsistent with this disclosure: U.S. Pat. No. 4,598,899, issued Jul. 8, 1986, to Paul V. Cooper, U.S. Pat. No. 5,203,681, issued Apr. 20, 1993, to Paul V. Cooper, U.S. Pat. No. 5,308,045, issued May 3, 1994, by Paul V. Cooper, U.S. Pat. No. 5,662,725, issued Sep. 2, 1997, by Paul V. Cooper, U.S. Pat. No. 5,678,807, issued Oct. 21, 1997, by Paul V. Cooper, U.S. Pat. No. 6,027,685, issued Feb. 22, 2000, by Paul V. Cooper, U.S. Pat. No. 6,124,523, issued Sep. 26, 2000, by Paul V. Cooper, U.S. Pat. No. 6,303,074, issued Oct. 16, 2001, by Paul V. Cooper, U.S. Pat. No. 6,689,310, issued Feb. 10, 2004, by Paul V. Cooper, U.S. Pat. No. 6,723,276, issued Apr. 20, 2004, by Paul V. Cooper, U.S. Pat. No. 7,402,276, issued Jul. 22, 2008, by Paul V. Cooper, U.S. Pat. No. 7,507,367, issued Mar. 24, 2009, by Paul V. Cooper, U.S. Pat. No. 7,906,068, issued Mar. 15, 2011, by Paul V. Cooper, U.S. Pat. No. 8,075,837, issued Dec. 13, 2011, by Paul V. Cooper, U.S. Pat. No. 8,110,141, issued Feb. 7, 2012, by Paul V. Cooper, U.S. Pat. No. 8,178,037, issued May 15, 2012, by Paul V. Cooper, U.S. Pat. No. 8,361,379, issued Jan. 29, 2013, by Paul V. Cooper, U.S. Pat. No. 8,366,993, issued Feb. 5, 2013, by Paul V. Cooper, U.S. Pat. No. 8,409,495, issued Apr. 2, 2013, by Paul V. Cooper, U.S. Pat. No. 8,440,135, issued May 15, 2013, by Paul V. Cooper, U.S. Pat. No. 8,444,911, issued May 21, 2013, by Paul V. Cooper, U.S. Pat. No. 8,475,708, issued Jul. 2, 2013, by Paul V. Cooper, U.S. patent application Ser. No. 12/895,796, filed Sep. 30, 2010, by Paul V. Cooper, U.S. patent application Ser. No. 12/877,988, filed Sep. 8, 2010, by Paul V. Cooper, U.S. patent application Ser. No. 12/853,238, filed Aug. 9, 2010, by Paul V. Cooper, U.S. patent application Ser. No. 12/880,027, filed Sep. 10, 2010, by Paul V. Cooper, U.S. patent application Ser. No. 13/752,312, filed Jan. 28, 2013, by Paul V. Cooper, U.S. patent application Ser. No. 13/756,468, filed Jan. 31, 2013, by Paul V. Cooper, U.S. patent application Ser. No. 13/791,889, filed Mar. 8, 2013, by Paul V. Cooper, U.S. patent application Ser. No. 13/791,952, filed Mar. 9, 2013, by Paul V. Cooper, U.S. patent application Ser. No. 13/841,594, filed Mar. 15, 2013, by Paul V. Cooper, and U.S. patent application Ser. No. 14/027,237, filed Sep. 15, 2013, by Paul V. Cooper.

Three basic types of pumps for pumping molten metal, such as molten aluminum, are utilized: circulation pumps, transfer pumps and gas-release pumps. Circulation pumps are used to circulate the molten metal within a bath, thereby generally equalizing the temperature of the molten metal. Circulation pumps may be used in any vessel, such as in a reverbatory furnace having an external well. The well is usually an extension of the charging well, in which scrap metal is charged (i.e., added).

Standard transfer pumps are generally used to transfer molten metal from one structure to another structure such as a ladle or another furnace. A standard transfer pump has a riser tube connected to a pump discharge and supported by the superstructure. As molten metal is pumped it is pushed up the riser tube (sometimes called a metal-transfer conduit) and out of the riser tube, which generally has an elbow at its upper end, so molten metal is released into a different vessel from which the pump is positioned.

Gas-release pumps, such as gas-injection pumps, circulate molten metal while introducing a gas into the molten metal. In the purification of molten metals, particularly aluminum, it is frequently desired to remove dissolved gases such as hydrogen, or dissolved metals, such as magnesium. As is known by those skilled in the art, the removing of dissolved gas is known as "degassing" while the removal of magnesium is known as "demagging." Gas-release pumps may be used for either of both of these purposes or for any other application for which it is desirable to introduce gas into molten metal.

Gas-release pumps generally include a gas-transfer conduit having a first end that is connected to a gas source and a second end submerged in the molten metal bath. Gas is introduced into the first end and is released from the second end into the molten metal. The gas may be released downstream of the pump chamber into either the pump discharge or a metal-transfer conduit extending from the discharge, or into a stream of molten metal exiting either the discharge or the metal-transfer conduit. Alternatively, gas may be released into the pump chamber or upstream of the pump chamber at a position where molten metal enters the pump chamber. The gas may also be released into any suitable location in a molten metal bath.

Molten metal pump casings and rotors often employ a bearing system comprising ceramic rings wherein there are one or more rings on the rotor that align with rings in the pump chamber (such as rings at the inlet and outlet) when the rotor is placed in the pump chamber. The purpose of the bearing system is to reduce damage to the soft, graphite components, particularly the rotor and pump base, during pump operation.

Generally, a degasser (also called a rotary degasser) includes (1) an impeller shaft having a first end, a second end and a passage for transferring gas, (2) an impeller, and (3) a drive source for rotating the impeller shaft and the impeller. The first end of the impeller shaft is connected to the drive source and to a gas source and the second end is connected to the impeller.

Generally a scrap melter includes an impeller affixed to an end of a drive shaft, and a drive source attached to the other end of the drive shaft for rotating the shaft and the impeller. The movement of the impeller draws molten metal and scrap metal downward into the molten metal bath in order to melt the scrap. A circulation pump is preferably used in conjunction with the scrap melter to circulate the molten metal in order to maintain a relatively constant temperature within the molten metal.

The materials forming the components that contact the molten metal bath should remain relatively stable in the bath. Structural refractory materials, such as graphite or ceramics, that are resistant to disintegration by corrosive attack from the molten metal may be used. As used herein "ceramics" or "ceramic" refers to any oxidized metal (including silicon) or carbon-based material, excluding graphite, or other ceramic material capable of being used in the environment of a molten metal bath. "Graphite" means any type of graphite, whether or not chemically treated. Graphite is particularly suitable for being formed into pump components because it is (a) soft and relatively easy to machine, (b) not as brittle as ceramics and less prone to breakage, and (c) less expensive than ceramics.

Ceramic, however, is more resistant to corrosion by molten aluminum than graphite. It would therefore be advantageous to develop vertical members used in a molten metal device that are comprised of ceramic, but less costly than solid ceramic members, and less prone to breakage than normal ceramic.

SUMMARY OF THE INVENTION

A launder for use in moving molten metal includes at least one relatively narrow channel through which molten metal flows. Using a narrow, rather than a broad, channel permits better control of the flow and helps prevent overflowing the launder or a structure adjacent the launder. A molten metal pumping or transfer system may utilize a launder as disclosed herein.

DETAILED DESCRIPTION

Figure 1:
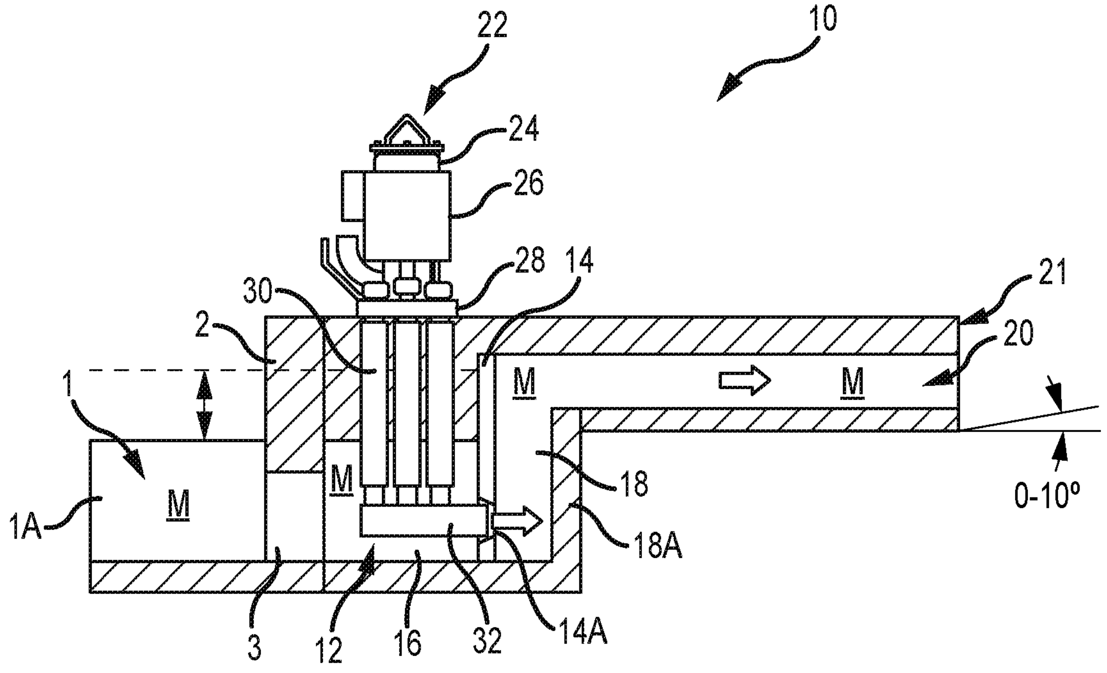
FIG. 1 is a cross-sectional side view of an exemplary system according to this disclosure.

Turning now to the Figures, wherein the purpose is to describe preferred embodiments of the invention and not to limit same, FIGS. 1-3A show a system 10 for moving molten metal M out of a vessel and into a launder. System 10 includes a furnace 1 that can retain molten metal M, which includes a holding furnace 1A, a vessel 12, a launder 20, and a pump 22. System 10 preferably has a vessel 12, a dividing wall 14 to separate vessel 12 into at least a first chamber 16 and a second chamber 18, and a device or structure, which may be pump 22, for generating a stream of molten metal from first chamber 16 into second chamber 18.

Figure 2:
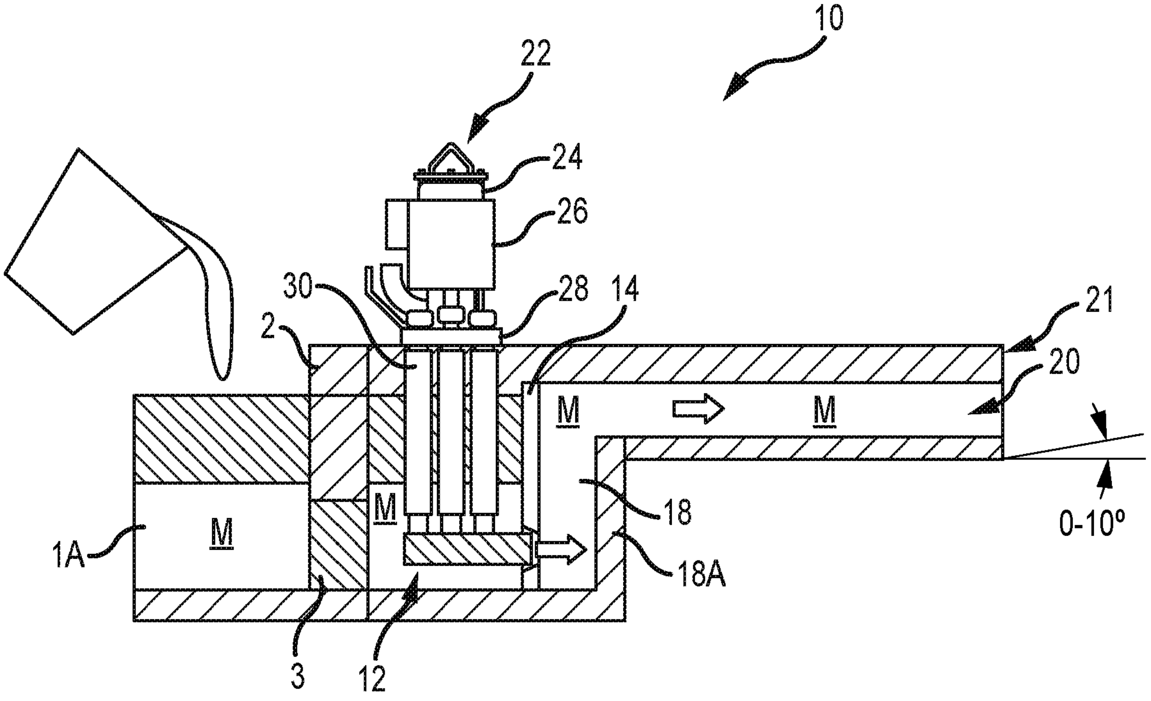
FIG. 2 is the system of FIG. 1 showing the level of molten metal in the furnace being increased.

Using heating elements (not shown in the figures), furnace 1 is raised to a temperature sufficient to maintain the metal therein (usually aluminum or zinc) in a molten state. The level of molten metal M in holding furnace 1A and in at least part of vessel 12 changes as metal is added or removed to furnace 1A, as can be seen in FIG. 2.

For explanation, furnace 1 includes a furnace wall 2 having an archway 3. Archway 3 allows molten metal M to flow into vessel 12 from holding furnace 1A. In this embodiment, furnace 1A and vessel 12 are in fluid communication, so when the level of molten metal in furnace 1A rises, the level also rises in at least part of vessel 12. It most preferably rises and falls in first chamber 16 as the level of molten metal rises or falls in furnace 1A.

Dividing wall 14 separates vessel 12 into at least two chambers, a pump well (or first chamber) 16 and a skim well (or second chamber) 18, and any suitable structure for this purpose may be used as dividing wall 14. As shown in this embodiment, dividing wall 14 has an opening 14A and an optional overflow spillway 14B (best seen in FIG. 3), which is a notch or cut out in the upper edge of dividing wall 14. Overflow spillway 14B is any structure suitable to allow molten metal to flow from second chamber 18, past dividing wall 14, and into first chamber 16 and, if used, overflow spillway 14B may be positioned at any suitable location on wall 14. The purpose of optional overflow spillway 14B is to prevent molten metal from overflowing the second chamber 18, or a launder in communication with second chamber 18 (if a launder is used with the invention), by allowing molten metal in second chamber 18 to flow back into first chamber 16. Optional overflow spillway 14B would not be utilized during normal operation of system 10 and is to be used as a safeguard if the level of molten metal in second chamber 18 improperly rises to too high a level.

Figure 2A:
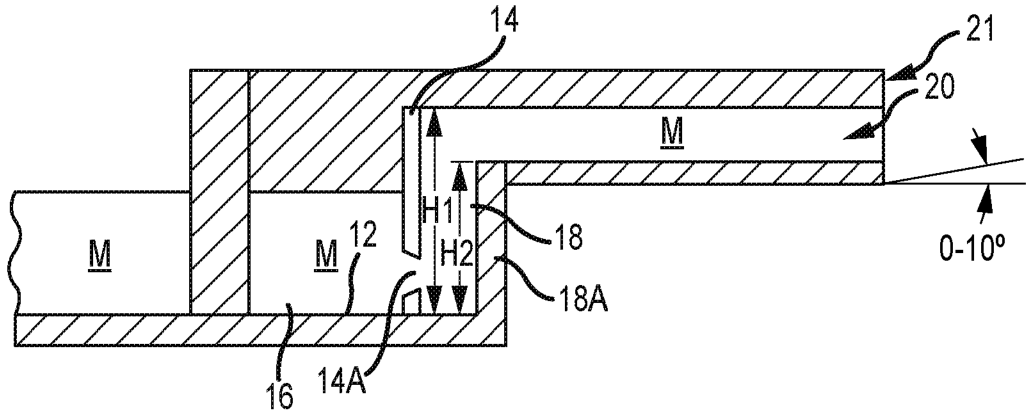
FIG. 2A shows the system of FIGS. 1 and 2 and displays how heights H1 and H2 are determined.
Figure 3:
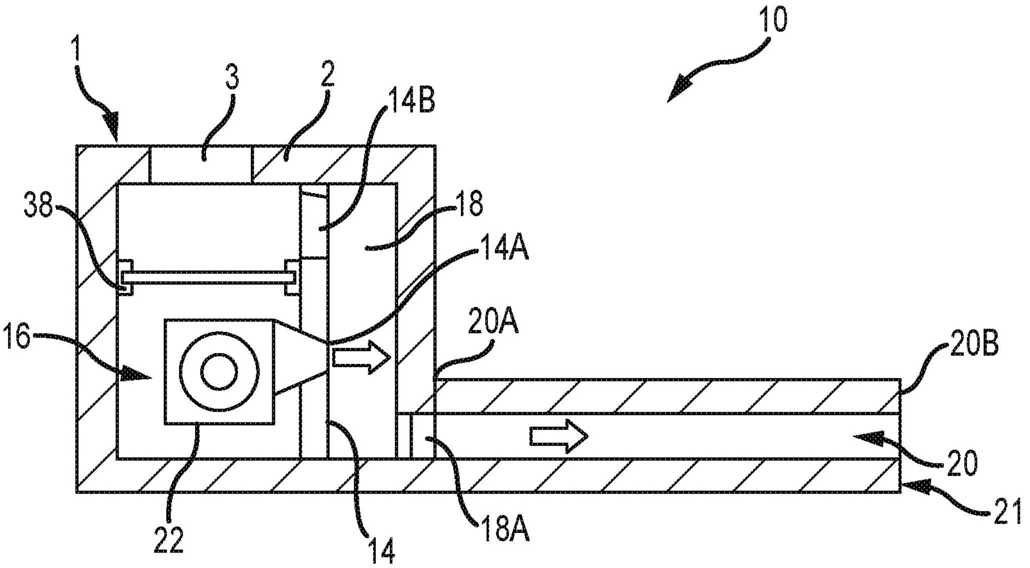
FIG. 3 is a top view of the system of FIG. 1.
Figure 3A:
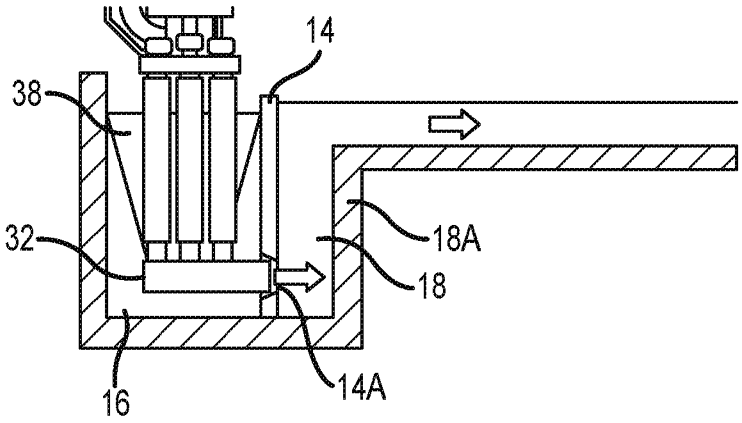
FIG. 3A is a partial, side, cross-sectional view of a system according to an embodiment of this disclosure.

Second chamber 18 has a wall portion 18A, which has a height H2, wherein H2 is less than H1 (as can be best seen in FIG. 2A) so during normal operation molten metal pumped into second chamber 18 flows past wall portion 18A and out of second chamber 18 rather than flowing back over dividing wall 14 and into first chamber 16.

At least part of dividing wall 14 has a height H1 (best seen in FIG. 2A), which is the height at which, if exceeded by molten metal in second chamber 18, molten metal flows past the portion of dividing wall 14 at height H1 and back into first chamber 16. In the embodiment shown in FIGS. 1-3A, overflow spillway 14B has a height H1 and the rest of dividing wall 14 has a height greater than H1. Alternatively, dividing wall 14 may not have an overflow spillway, in which case all of dividing wall 14 could have a height H1, or dividing wall 14 may have an opening with a lower edge positioned at height H1, in which case molten metal could flow through the opening if the level of molten metal in second chamber 18 exceeded H1. H1 should exceed the highest level of molten metal in first chamber 16 during normal operation.

Dividing wall 14 may also have an opening 14A that is located at a depth such that opening 14A is submerged within the molten metal during normal usage, and opening 14A is preferably near or at the bottom of dividing wall 14. Opening 14A preferably has an area of between 6 $in.^2$ and 24 $in.^2$, but could be any suitable size. Further, dividing wall 14 need not have an opening if a transfer pump were used to transfer molten metal from first chamber 16, over the top of wall 14, and into second chamber 18 as described below.

Dividing wall 14 may also include more than one opening between first chamber 16 and second chamber 18 and opening 14A (or the more than one opening) could be positioned at any suitable location(s) in dividing wall 14 and be of any size(s) or shape(s) to enable molten metal to pass from first chamber 16 into second chamber 18.

Molten metal pump 22 may be any device or structure capable of pumping or otherwise conveying molten metal, and may be a transfer, circulation or gas-release pump. Pump 22 is preferably a circulation pump (most preferred) or gas-release pump that generates a flow of molten metal from first chamber 16 to second chamber 18 through opening 14A. Pump 22 generally includes a motor 24 surrounded by a cooling shroud 26, a superstructure 28, support posts 30 and a base 32. Some pumps that may be used with the invention are shown in U.S. Pat. Nos. 5,203,681, 6,123,523 and 6,354,964 to Cooper, and pending U.S. application Ser. No. 10/773,101 to Cooper. Molten metal pump 22 can be a constant speed pump, but is most preferably a variable speed pump. Its speed can be varied depending on the amount of molten metal in a structure such as a ladle or launder, as discussed below.

Utilizing system 10, as pump 22 pumps molten metal from first chamber 16 into second chamber 18, the level of molten metal in chamber 18 rises. When a pump with a discharge submerged in the molten metal bath, such as circulation pump or gas-release pump is utilized, there is essentially no turbulence or splashing during this process, which reduces the formation of dross and reduces safety hazards. The flow of molten metal is smooth and generally at an even flow rate.

If pump 22 is a circulation pump or gas-release pump, it is preferably at least partially received in opening 14A in order to at least partially block opening 14A in order to maintain a relatively stable level of molten metal in second chamber 18 during normal operation and to allow the level in second chamber 18 to rise independently of the level in first chamber 16. Utilizing this system the movement of molten metal from one chamber to another and from the second chamber into a launder does not involve raising molten metal above the molten metal surface. As previously mentioned this alleviates problems with blockage forming (because of the molten metal cooling and solidifying), and with turbulence and splashing, which can cause dross formation and safety problems. As shown, part of base 32 (preferably the discharge portion of the base) is received in opening 14A. Further, pump 22 may communicate with another structure, such as a metal-transfer conduit, that leads to and is received partially or fully in opening 14A. Although it is preferred that the pump base, or communicating structure such as a metal-transfer conduit, be received in opening 14A, all that is necessary for the invention to function is that the operation of the pump increases and maintains the level of molten metal in second chamber 18 so that the molten metal ultimately moves out of chamber 18 and into another structure. For example, the base of pump 22 may be positioned so that its discharge is not received in opening 14A, but is close enough to opening 14A that the operation of the pump raises the level of molten metal in second chamber 18 independent of the level in chamber 16 and causes molten metal to move out of second chamber 18 and into another structure. A sealant, such as cement (which is known to those skilled in the art), may be used to seal base 32 into opening 14A, although it is preferred that a sealant not be used.

Once pump 22 is turned off, the respective levels of molten metal level in chambers 16 and 18 essentially equalize. Alternatively, the speed of pump 22 could be reduced to a relatively low speed to keep the level of molten metal in second chamber 18 relatively constant but not exceed height H2. To move molten metal onto raised surface 20, pump 22 is simply turned on again and operated as described above.

A system according to this disclosure could also include one or more pumps in addition to pump 22, in which case the additional pump(s) may circulate molten metal within first chamber 16 and/or second chamber 18, or from chamber 16 to chamber 18, and/or may release gas into the molten metal first in first chamber 16 or second chamber 18. For example, first chamber 16 could include pump 22 and a second pump, such as a circulation pump or gas-release pump, to circulate and/or release gas into molten metal M.

As shown in FIGS. 1-3A, launder 20 is any structure or device for transferring molten metal to one or more structures, such as one or more ladles, molds (such as ingot molds) or other structures in which the molten metal is ultimately cast into a usable form, such as an ingot. Launder 20 may be either an open or enclosed channel, trough or conduit and may be of any suitable dimension or length, such as one to four feet long, or as much as 100 feet long or longer. Launder 20 may be completely horizontal or may slope gently upward or downward. Launder 20 may have one or more taps (not shown), i.e., small openings stopped by removable plugs. Each tap, when unstopped, allows molten metal to flow through the tap into a ladle, ingot mold, or other structure. Launder 20 may additionally or alternatively be serviced by robots or cast machines capable of removing molten metal M from launder 31.

Launder 20 has a first end 21A and a second end 21B that is opposite first end 21B. An optional stop may be included in a launder according to this disclosure. The stop, if used, is preferably juxtaposed the second end 21B of the launder. If launder 20 has a stop, the stop can be opened to allow molten metal to flow past end 21B, or closed to prevent molten metal from flowing past end 21B. The stop preferably has a height greater than height H1 so that if launder 20 becomes too filled with molten metal, the molten metal would back up inside launder 20, and spill back over dividing wall 14A (over spillway 14B, if used) rather than overflow launder 20.

Figure 4:
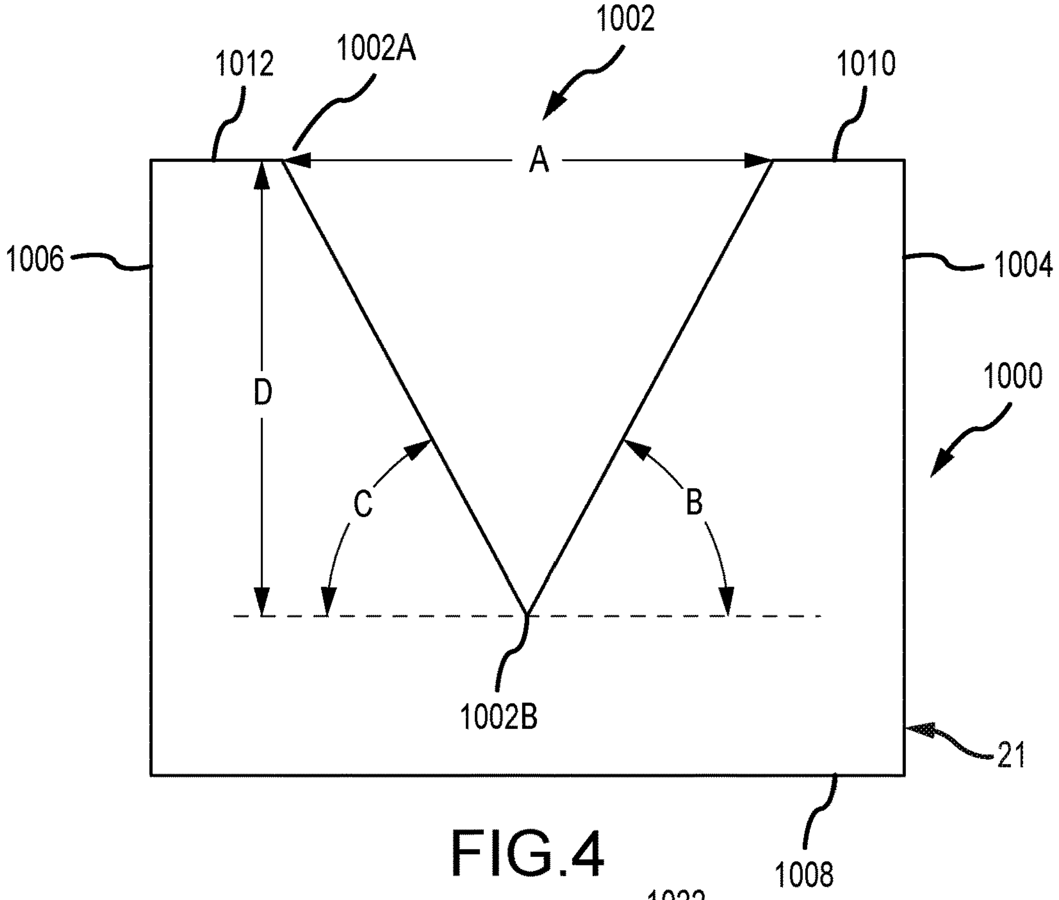
FIG. 4 is an end view of a launder according to an embodiment this disclosure.

Turning now to FIG. 4, disclosed is a launder 1000 that could be used with system 10, or with any suitable molten metal pumping or transfer device or system. Launder 1000 is comprised of a material, such as graphite or ceramic (such as silicon dioxide) and is configured to transfer molten metal from one place to another.

The launder 1000 has a channel 1002, a first side 1004, a second side 1006, a bottom 1008, a first top surface 1010 juxtaposed side 1004, and a second top surface 1012 juxtaposed side 1006.

Channel 1002 as shown is v-shaped. It has a top 1002A having first width A, a first angle B, a third angle C, and a bottom 1002B. The first width A may be any suitable amount, such as 50%-75%, or 60%-90%, or 50%-90%, or 50% or more, or 20%-50%, or any amount from 20%-90% of the entire width of launder 1000.

The depth D of channel 1002 as measured from top surface 1012 or 1010 to bottom 1002B is any suitable amount, such as 50%-75%, or 60%-90%, or 50%-90%, or 50% or more, or 20%-50%, or any amount from 25%-90% of the height of launder 1000 measured along either first side 1004 or second side 1006.

Angle B is any suitable angle and is preferably from 30°-60°, or 20°-70°, or 40°-50°, or 45°, or any amount from 20%-70%. Angle C is any suitable angle and is preferably from 30°-60°, or any amount from 20°-70°, or 40°-50°, or 45°.

Figure 5:
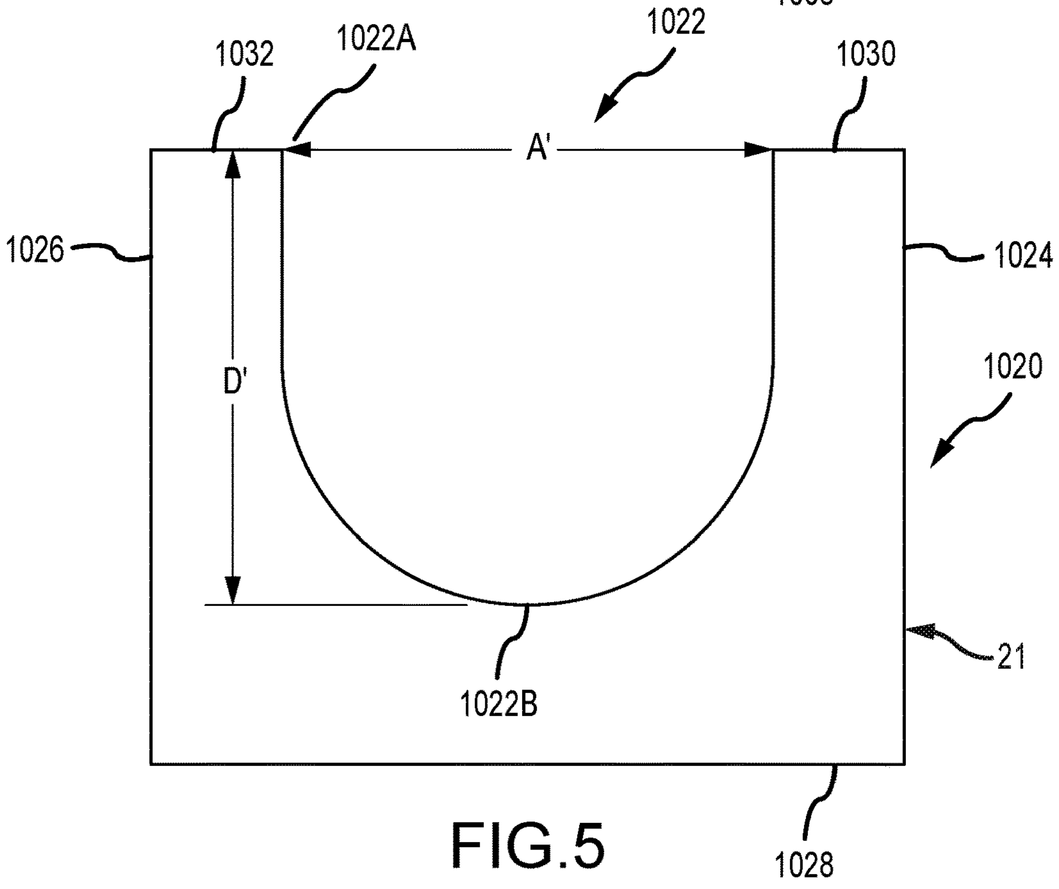
FIG. 5 is an end view of an alternate launder of this disclosure.

As shown in FIG. 5, launder 1020 is the same as launder 1000 except that it has a channel 1022 with a U-shaped bottom portion. Channel 1022 has a top opening 1022A with a first width A, which may be any suitable amount, such as 50%-75%, or 60%-90%, or 50%-90%, or 50% or more, or 20%-50%, or any amount from 20%-90% of the entire width of launder 1020. The depth D' of channel 1022 as measured from top surface 1032 or 1030 to bottom 1028 is any suitable amount, such as 50%-75%, or 60%-90%, or 50%-90%, or 50% or more, or 20%-50%, or any amount from 20%-90% of the height of launder 1020 measured along either first side 1024 or second side 1026.

Figure 6:
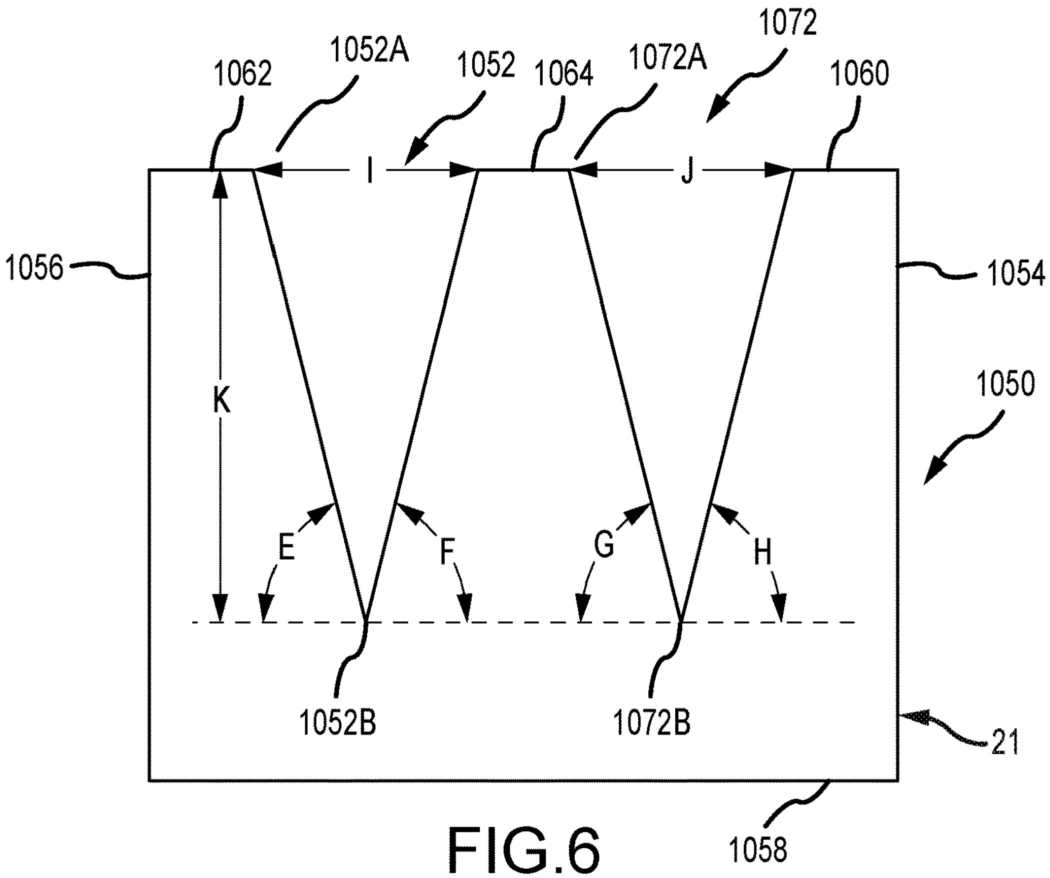
FIG. 6 is an end view of an alternate launder of this disclosure.

As shown in FIG. 6, launder 1050 has two channels 1052 and 1072. The launder 1050 has a first side 1054, a second side 1056, a bottom 1056, a first top surface 1060 juxtaposed side 1050, a second top surface 1062 juxtaposed side 1056, and a center top surface 1064.

Each channel 1052 and 1072 as shown is v-shaped. Channel 1052 has a top 1052A having a first width I, a first angle E, a third angle F, and a bottom 1052B. The first width I may be any suitable amount, such as 10%-20%, 10%-30%, 20%-30%, 20%-40%, 50%-75%, or 60%-90%, or 50%-90%, or 50% or more, or any amount from 20%-50%, of the entire width of launder 1050.

The depth K of channel 1052 as measured from top surface 1062, 1064, or 1060 to bottom 1058 is any suitable amount, such as 50%-75%, or 60%-90%, or 50%-90%, or 50% or more, or 20%-50%, or any amount from 20%-90% of the height of launder 1050 measured along either first side 1054 or second side 1054.

Channel 1072 has a top 1072A having a first width J, a first angle G, a third angle H, and a bottom 1072B. The first width J may be any suitable amount, such as 10%-20%, 10%-30%, 20%-30%, 20%-40%, 50%-75%, or 60%-90%, or 50%-90%, or 50% or more, or any amount from 20%-50%, of the entire width of launder 1050.

The depth K of channel 1072 as measured from top surface 1062, 1064, or 1060 to bottom 1058 is any suitable amount, such as 50%-75%, or 60%-90%, or 50%-90%, or 50% or more, or 20%-50%, or any amount from 20%-90% of the height of launder 1050 measured along either first side 1054 or second side 1054.

Channels 1052 and 1072 need not have the same width or depth.

Angle E is any suitable angle and is preferably from 30°-60°, or 20°-70°, or 40°-50°, or 45°, or 55°-70°. Angle F is any suitable angle and is preferably from 30°-60°, or 20°-70°, or 40°-50°, or 45°, or 55°-70°, or any amount from 30%-70%. Angle G is any suitable angle and is preferably from 30°-60°, or 20°-70°, or 40°-50°, or 45°, or 55°-70°, or any amount from 30%-70%. Angle H is any suitable angle and is preferably from 30°-60°, or 20°-70°, or 40°-50°, or 45°, or 55°-70°, or any amount from 30%-70%.

Figure 7:
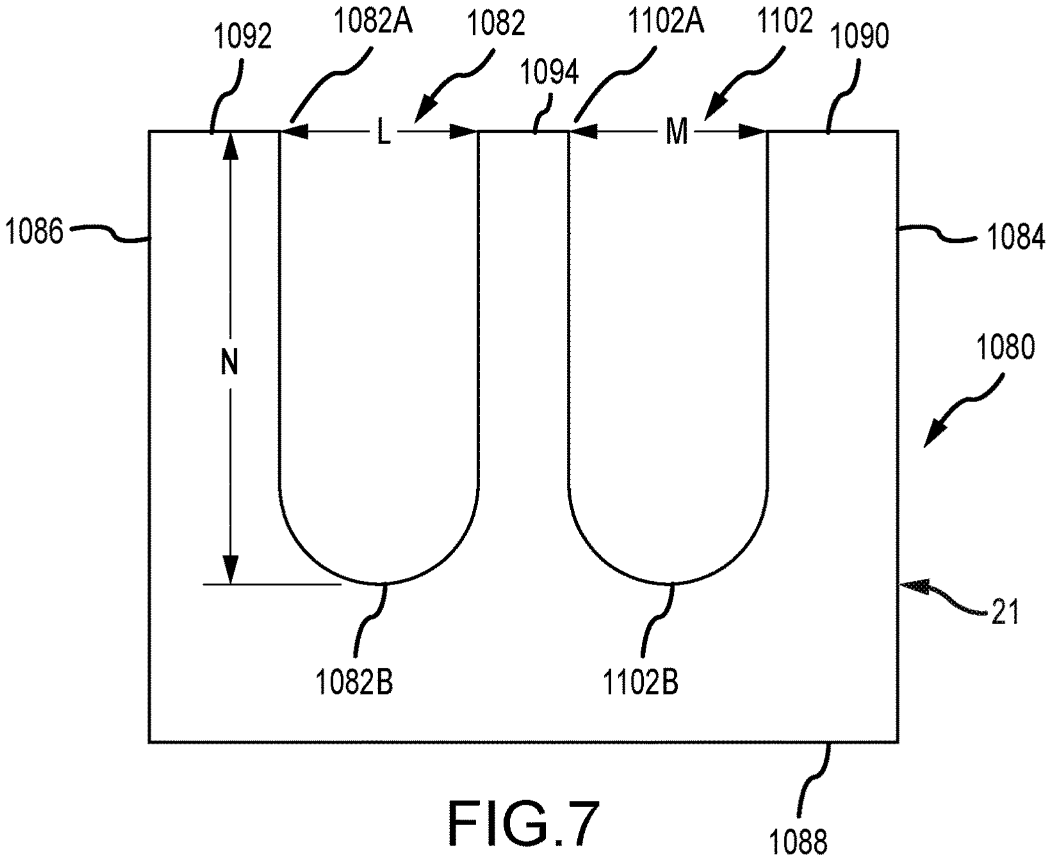
FIG. 7 is an end view of an alternate launder of this disclosure.
Figure 8:
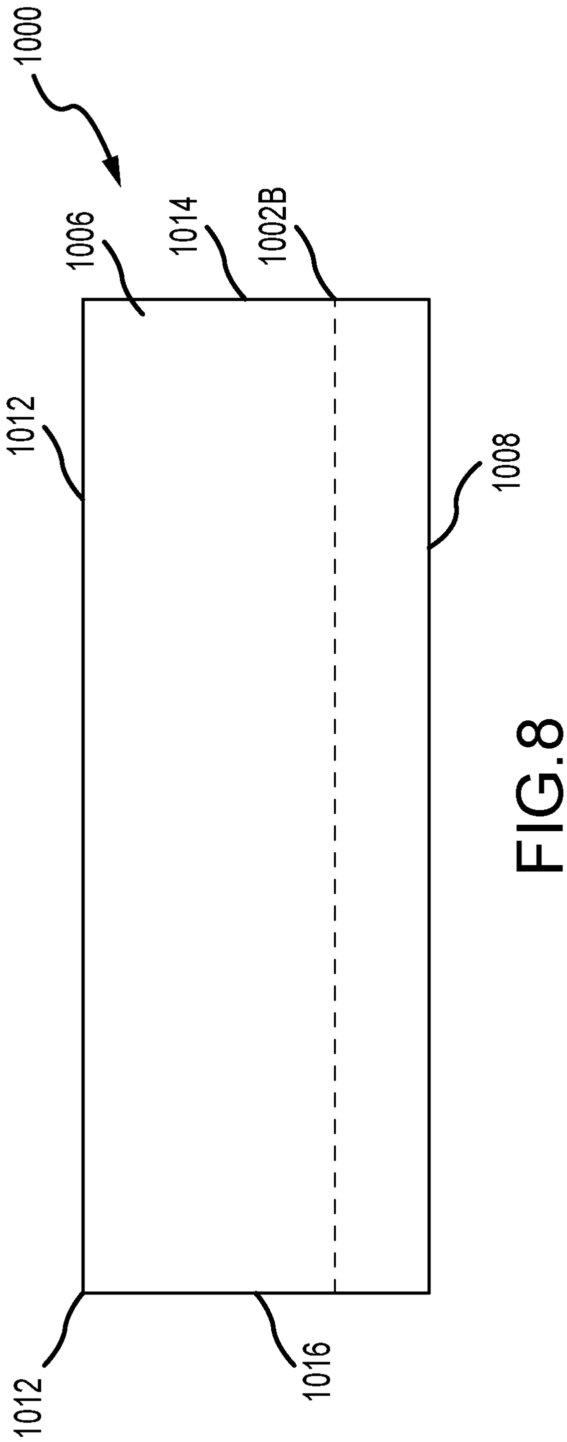
FIG. 8 is a side view of the launder of FIG. 4.
Figure 9:
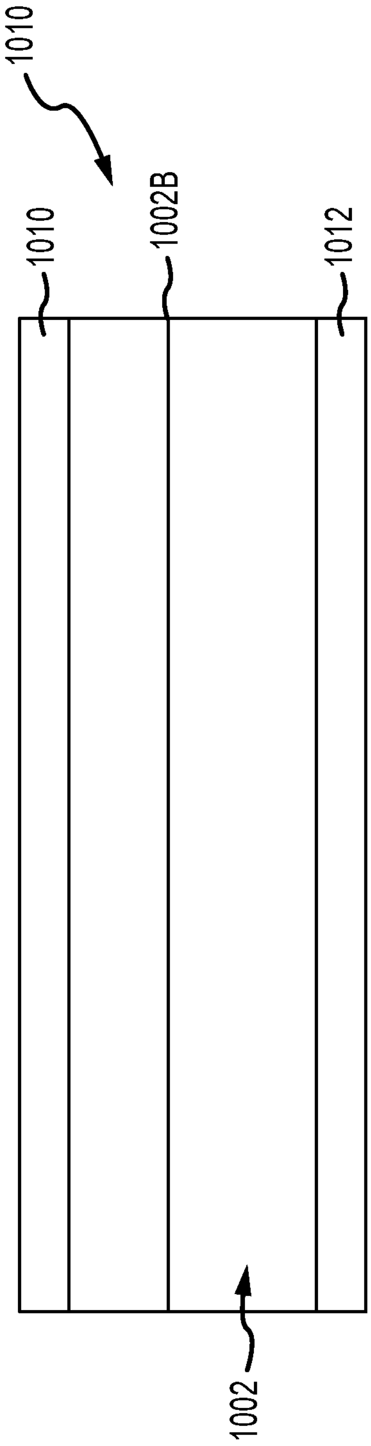
FIG. 9 is a top view of the launder of FIG. 4.
Figure 10:
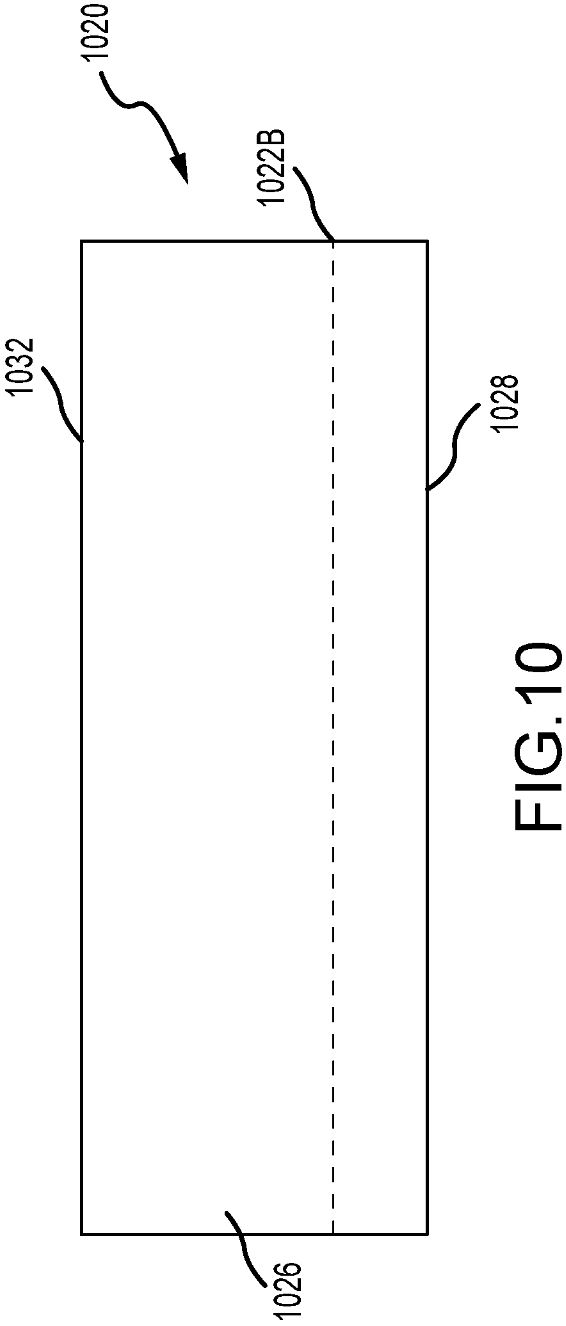
FIG. 10 is a side view of the launder of FIG. 5.
Figure 11:
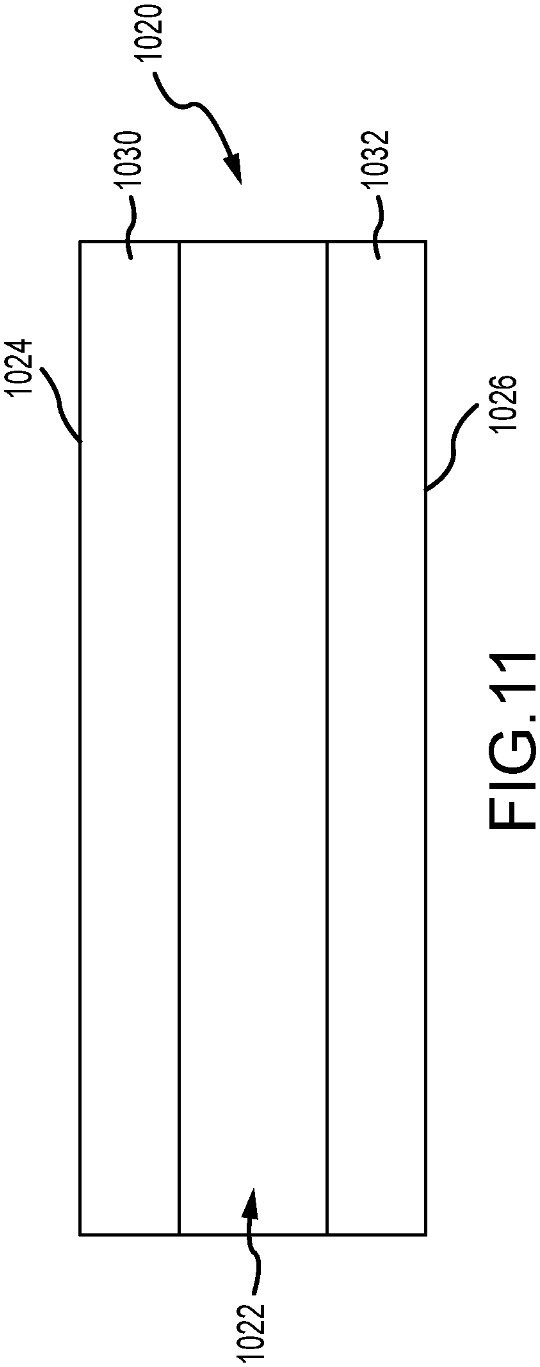
FIG. 11 is a top view of the launder of FIG. 5.
Figure 12:
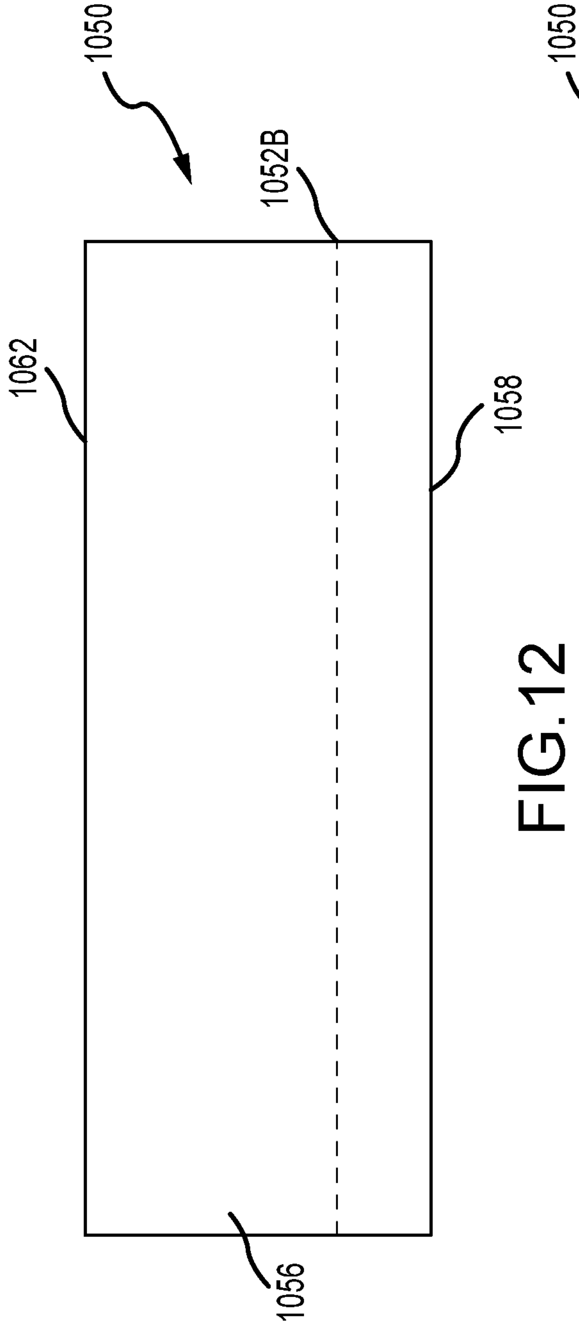
FIG. 12 is a side view of the launder of FIG. 6.
Figure 13:
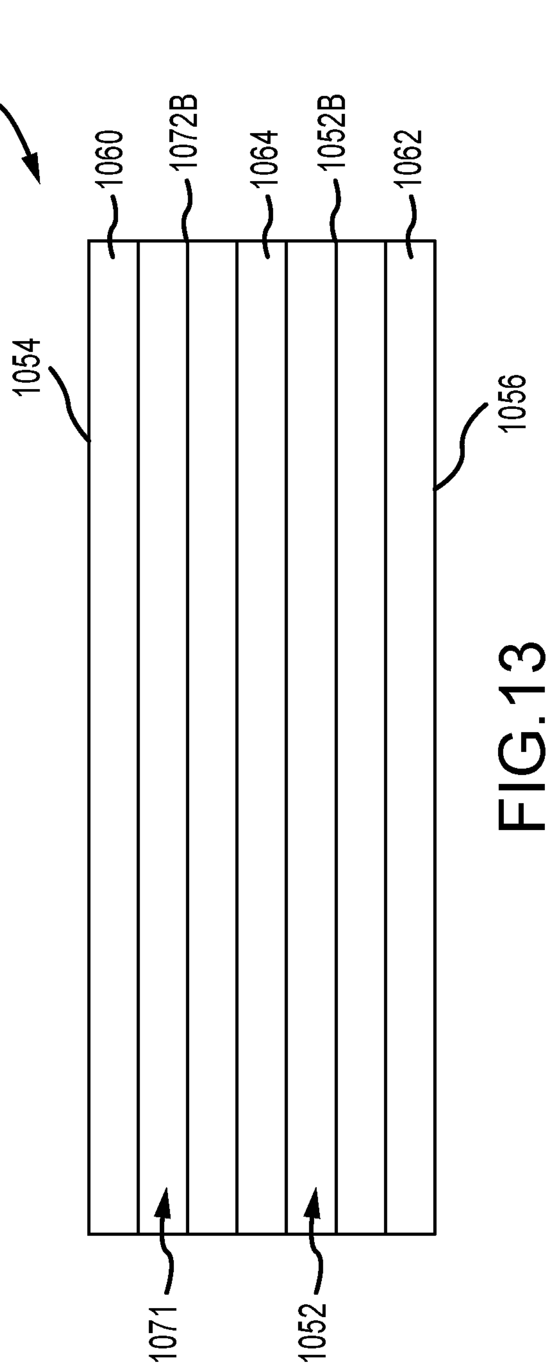
FIG. 13 is a top view of the launder of FIG. 6.
Figure 14:
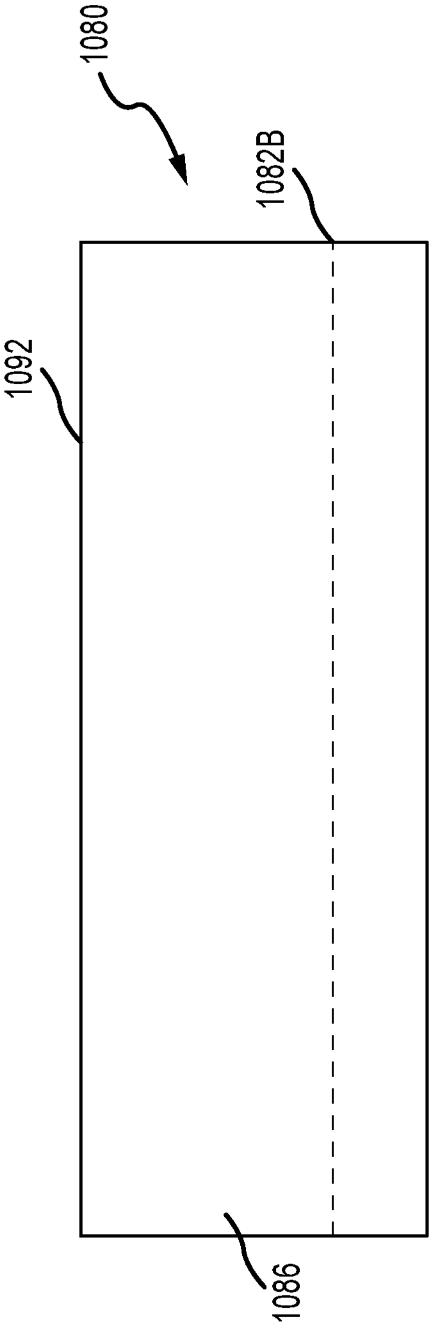
FIG. 14 is a side view of the launder of FIG. 7.
Figure 15:
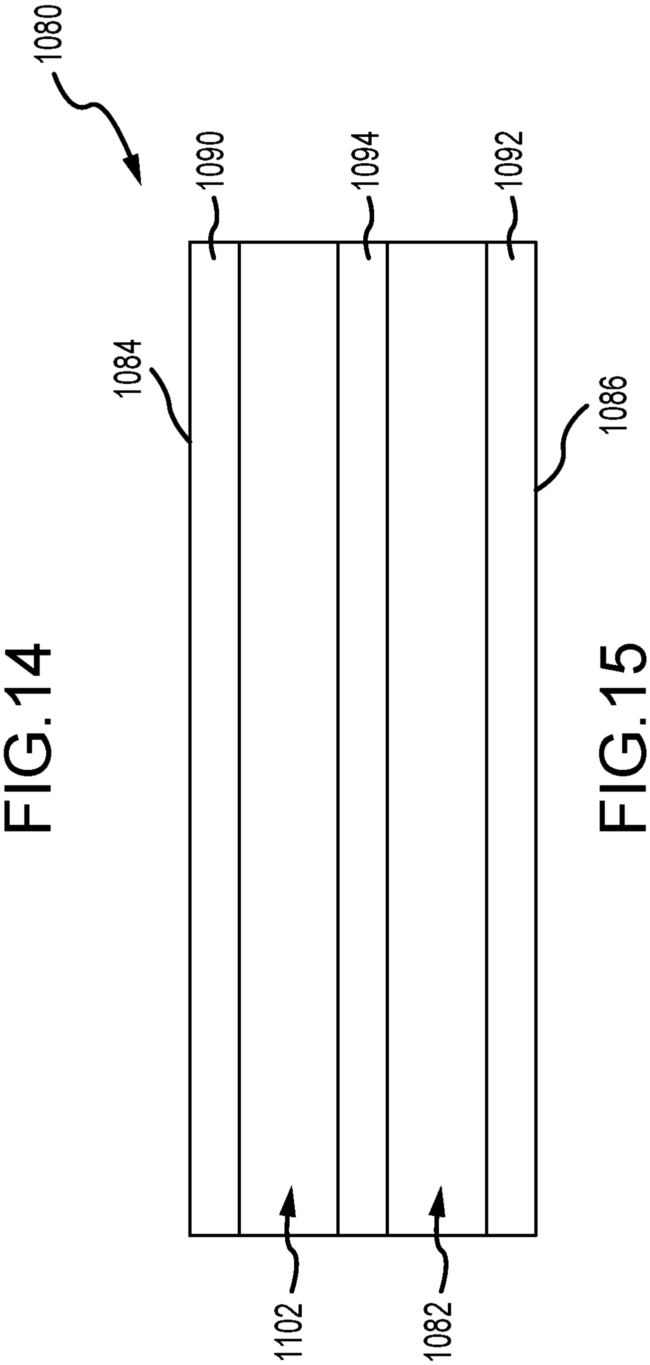
FIG. 15 is a top view of the launder of FIG. 7.

As shown in FIG. 7, launder 1080 is the same as launder 1050 except that it has channels 1082 and 1102, each having U-shaped bottom portions 1082B, 1102B. Channel 1082 has a top 1082A with a first width L, which may be any suitable amount, such as 50%-75%, or 60%-90%, or 50%-90%, or 50% or more, or 20%-50%, or 20%-30%, or any amount from 30%-50% of the entire width of launder 1080. The depth N of channel 1082 as measured from top surface 1090, 1092, or 1094 to bottom 1088 is any suitable amount, such as 50%-75%, or 60%-90%, or 50%-90%, or 50% or more, or 20%-50%, or any amount from 20%-90% of the height of launder 1080 measured along either first side 1084 or second side 1086.

Channel 1102 has a top 1102A with a first width M, which may be any suitable amount, such as 50%-75%, or 60%-90%, or 50%-90%, or 50% or more, or 20%-50%, or 20%-30%, or any amount from 20%-50% of the entire width of launder 1080. The depth N of channel 1102 as measured from top surface 1090, 1092, or 1094 to bottom 1088 is any suitable amount, such as 50%-75%, or 60%-90%, or 50%-90%, or 50% or more, or 20%-50%, or any amount from 20%-90% of the height of launder 1080 measured along either first side 1084 or second side 1086.

Channels 1082 and 1102 need not have the same width or depth.

Some non-limiting examples of this disclosure are as follow:

Example 1: A launder for use in moving molten metal, the launder comprising:

(a) graphite or ceramic;

(b) at least one channel configured to transfer molten metal, the channel having an upper cross-sectional area and a lower cross-sectional area, the lower cross-sectional area being smaller than the upper cross-sectional area.

Example 2: The launder of example 1, wherein the channel is V-shaped.

Example 3: The launder of example 1, wherein the channel is U-shaped.

Example 4: The launder of example 1 that is comprised of ceramic.

Example 5: The launder of any of examples 1-4, wherein the channel is centered in the launder.

Example 6: The launder of any of examples 1-5, wherein the top of the channel has a channel width and top of launder has a launder width, and the channel width is 50% or more of the launder width.

Example 7: The launder of any of examples 1-5, wherein the top of the channel has a channel width and top of launder has a launder width, and the channel width is 50% or less of the launder width.

Example 8: The launder of example 1 that has a plurality of channels.

Example 9: The launder of example 8, wherein each of the plurality of channels is V-shaped.

Example 10: The launder of any of examples 1-7 that further includes a launder height and a channel height and the channel height is 50% or more of the launder height.

Example 11: The launder of any of examples 1-7 that further includes a launder height and a channel height and the channel height is 50% or less of the launder height.

Example 12: The launder of example 2, wherein each side of the V-shaped launder is formed at an angle of 30 degrees-60 degrees from the horizontal axis.

Example 13: The launder of example 2, wherein each side of the V-shaped launder is formed at an angle of 45 degrees from the horizontal axis.

Having thus described different embodiments of the invention, other variations and embodiments that do not depart from the spirit of the invention will become apparent to those skilled in the art. The scope of the present invention is thus not limited to any particular embodiment, but is instead set forth in the appended claims and the legal equivalents thereof. Unless expressly stated in the written description or claims, the steps of any method recited in the claims may be performed in any order capable of yielding the desired product.

What is claimed is:

1. A unitary launder for use in moving molten metal, the launder comprising:

(a) a top surface, and no non-oxidic ceramic material;

(b) a channel configured to transfer molten metal, the channel being V-shaped and having an open top comprising an upper cross-sectional area and a bottom tip comprising no cross-sectional area, wherein each side of the V-shaped channel is formed at an angle of 30 degrees—60 degrees from the horizontal axis and each angled side extends from the bottom tip to the top surface of the launder; and (c) a grate in the channel, wherein the grate is configured to filter solid pieces from molten metal.

2. The launder of claim 1 that is comprised of ceramic.

3. The launder of claim 1, wherein the channel is centered in the launder.

4. The launder of claim 1, wherein the top of the channel has a channel width and top of launder has a launder width, and the channel width is 50% or more of the launder width.

5. The launder of claim 1, wherein the top of the channel has a channel width and top of launder has a launder width, and the channel width is 50% or less of the launder width.

6. The launder of claim 1 that comprises a plurality of channels.

7. The launder of claim 6, wherein each of the plurality of channels is V-shaped.

8. The launder of claim 1 that further includes a launder height and a channel height and the channel height is 50% or more of the launder height.

9. The launder of claim 1 that further includes a launder height and a channel height and the channel height is 50% or less of the launder height.

10. The launder of claim 1, wherein each side of the V-shaped channel is formed at an angle of 45 degrees from the horizontal axis.

11. The launder of claim 1 that is comprised of oxidized ceramic or refractory material.

* * * * *